US006182166B1

(12) United States Patent
Shklarsky et al.

(10) Patent No.: US 6,182,166 B1
(45) Date of Patent: Jan. 30, 2001

(54) METHOD/APPARATUS FOR INTERFACING TWO REMOTELY DISPOSED DEVICES COUPLED VIA TRANSMISSION MEDIUM WITH FIRST AND SECOND COMMANDS TRANSMITTED WITHOUT FIRST CHECKING RECEIVING DEVICE FOR READINESS

(75) Inventors: Gadi Shklarsky; Natan Vishlitzky, both of Brookline; Yuval Ofek, Framingham, all of MA (US); Ramprasad Shetty, Durham, NC (US)

(73) Assignee: EMC Corporation, Hopkinston, MA (US)

( * ) Notice: Under 35 U.S.C. 154(b), the term of this patent shall be extended for 0 days.

(21) Appl. No.: 08/918,238

(22) Filed: Aug. 25, 1997

(51) Int. Cl.⁷ .............................. G06F 3/06; G06F 12/00; G06F 13/00; G06F 13/14
(52) U.S. Cl. .................................. 710/33; 710/5; 710/41; 709/213; 709/219; 709/237; 711/100; 714/1; 714/6
(58) Field of Search .............................. 707/9; 709/219, 709/237, 213; 711/100, 102; 714/1, 6, 13, 20, 752; 340/10.31; 370/313; 710/5, 33, 41

(56) References Cited

U.S. PATENT DOCUMENTS 4,818,984 * 4/1989 Chang et al. ..................... 340/10.31
5,010,547 * 4/1991 Johnson et al. ..................... 370/313
5,179,660 * 1/1993 Devany et al. ..................... 709/219
5,412,803 * 5/1995 Bartow et al. ..................... 395/575
5,446,871 * 8/1995 Shomler ..................... 714/1
5,504,861 * 4/1996 Crockett et al. ..................... 714/13
5,526,484 * 6/1996 Casper et al. ..................... 709/237
5,530,948 * 6/1996 Islam ..................... 714/6
5,544,347   8/1996 Yanai et al. .
5,555,371 * 9/1996 Duyanovich et al. ..................... 714/13
5,638,384 * 6/1997 Hayashi et al. ..................... 714/752
5,734,818 * 3/1998 Kern et al. ..................... 714/20
5,901,327 * 5/1999 Ofek ..................... 711/100
5,915,092 * 6/1999 Morita et al. ..................... 395/200.43
5,960,216 * 9/1999 Vishlitzky et al. ..................... 395/894

* cited by examiner

Primary Examiner—Thomas C. Lee
Assistant Examiner—Tanh Q. Nguyen
(74) Attorney, Agent, or Firm—Wolf, Greenfield & Sacks, P.C.

(57) ABSTRACT

A method and apparatus for communicating a plurality of commands from a first device to a second device over a data communication link coupling the first and second devices, the plurality of commands including at least a first command and a second command. The first and second commands are transmitted over the data communication link from the first device to the second device in a single data transmission such that only a single propagation delay through the data communication link is incurred in transmitting both the first and second commands over the data communication link.

96 Claims, 7 Drawing Sheets

| d(km) | BLOCK SIZE = 60K BYTES ||| BLOCK SIZE = 4K BYTES |||
|---|---|---|---|---|---|---|
| | Fig. 4 T(ms) | Fig. 5 T(ms) | Fig. 6 T(ms) | Fig. 4 T(ms) | Fig. 5 T(ms) | Fig. 6 T(ms) |
| 1000 | 95 | 45 | 25 | 81 | 31 | 11 |
| 2000 | 175 | 75 | 35 | 161 | 61 | 21 |
| 3000 | 255 | 105 | 45 | 241 | 91 | 31 |
| 4000 | 335 | 135 | 55 | 321 | 121 | 41 |
| 5000 | 415 | 165 | 65 | 401 | 151 | 51 |
| 6000 | 495 | 195 | 75 | 481 | 181 | 61 |

*Fig. 8*

METHOD/APPARATUS FOR INTERFACING TWO REMOTELY DISPOSED DEVICES COUPLED VIA TRANSMISSION MEDIUM WITH FIRST AND SECOND COMMANDS TRANSMITTED WITHOUT FIRST CHECKING RECEIVING DEVICE FOR READINESS

FIELD OF THE INVENTION

The present invention is directed to a method and apparatus for interfacing two remotely disposed devices over a transmission medium capable of transmitting data over long distances. The invention may be used, for example, to interface a master storage device of a host CPU to a remotely disposed mirroring storage device, particularly where the master storage device communicates with its host CPU using the ESCON protocol.

BACKGROUND OF THE INVENTION

ESCON is a standard computer system interface and protocol developed by International Business Machines (IBM). ESCON is applicable to an environment such as the one shown in FIG. 1, in which a central processing unit (CPU) 1 is coupled to a channel 3 having direct access to a main memory (not shown) of the CPU. The channel provides input/output capability to the CPU. More particularly, the channel 3 is coupled, over a link 5, to one or more control units 7, which each is in turn coupled to a plurality of I/O peripherals 9. Control unit 7 controls access to CPU 1, via channel 3, for each of the I/O peripherals 9, allowing each to have direct access to the CPU memory.

ESCON defines the interface and protocol for communicating over link 5 between channel 3 and control unit 7, and is described in detail, for example, in "ENTERPRISE SYSTEMS ARCHITECTURE/390—ESCON I/O INTERFACE", Third Edition (1992) published by IBM, which is incorporated herein by reference. Dedicated ESCON links have been provided so that control unit 7, along with its associated I/O peripherals 9, can be disposed at a location somewhat remote from CPU 1 and channel 3. However, these dedicated links have conventionally been limited to relatively short distances. For example, IBM states that its dedicated ESCON links are limited to approximately 60 km. Although this number may be conservative, it is believed that conventional dedicated ESCON links are limited to distances of approximately 80 km, even when appropriate repeaters are used along the line.

Conventional dedicated ESCON links between a channel and control unit suffer from two significant disadvantages. First, the above-described limit on the maximum supported distance may be insufficient for some applications. Second, it is often costly to implement these dedicated links because they are not part of a public communication network, and may not be capable of being implemented over pre-existing communication lines.

It is an object of the present invention to provide an improved interface for enabling communication between two remotely disposed devices, including ESCON compatible devices.

SUMMARY OF THE INVENTION

In one illustrative embodiment of the invention, a method is provided of communicating a plurality of commands from a first device to a second device over a data communication link coupling the first and second devices, the plurality of commands including at least a first command and a second command. The method comprises the step of transmitting the first and second commands over the data communication link from the first device to the second device in a single data transmission such that only a single propagation delay through the data communication link is incurred in transmitting both the first and second commands over the data communication link.

In another illustrative embodiment of the invention, a device is provided for transmitting a plurality of commands to another device over a data communication link, the plurality of commands including at least a first command and a second command. The device comprises transmitting means for transmitting the plurality of commands over the data communication link from the device to the another device, the transmitting means including means for transmitting the first and second commands over the data communication link in a single data transmission such that only a single propagation delay through the data communication link is incurred in transmitting both the first and second commands over the data communication link.

In a further illustrative embodiment of the invention, a communication system is provided comprising a first device, a second device and a data communication link coupling the first device to the second device. The first device includes transmitting means for transmitting a plurality of commands to the second device over the data communication link, the plurality of commands including at least a first command and a second command. The transmitting means includes means for transmitting the first and second commands over the data communication link in a single data transmission such that only a single propagation delay through the data communication link is incurred in transmitting both the first and second commands over the data communication link.

BRIEF DESCRIPTION OF THE DRAWINGS

FIG. 8 is a table providing a comparison of the relative performance of the protocols shown in FIGS. 4–6.

DETAILED DESCRIPTION

The present invention is directed to a method and apparatus for enabling communication between two remotely disposed devices over a communication medium capable of transmitting data over long distances. One illustrative example of an application in which the present invention can be used is a remote data mirroring facility discussed below in connection with FIG. 2. However, it should be understood that the present invention can be employed in numerous other applications and system configurations, and is not limited to use in a remote data mirroring facility.

Figure 1:
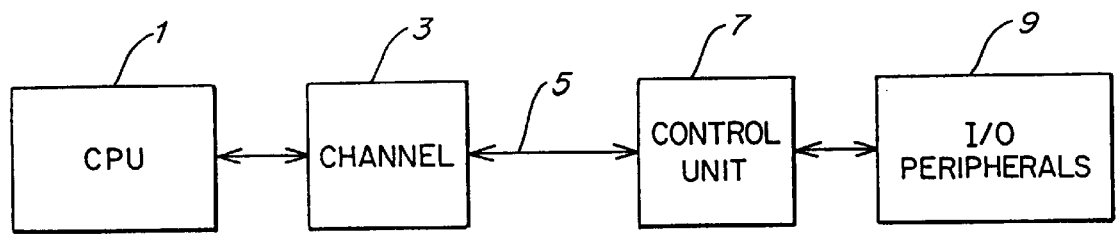
FIG. 1 is a block diagram of a conventional ESCON computer system environment.
Figure 2:
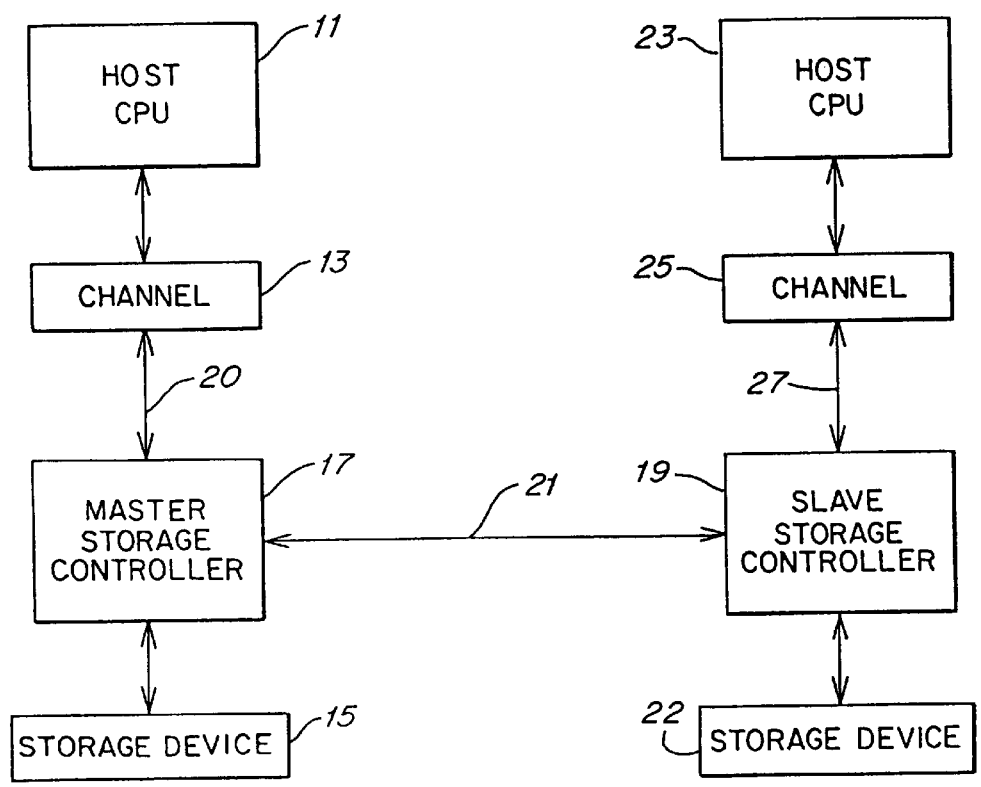
FIG. 2 is a block diagram of a master/slave remote data facility application in which the present invention can be used.

In the system shown in FIG. 2, a host CPU 11 and its associated channel 13 are coupled to a storage device 15 through a master storage controller 17. The storage device 15 may be a large disk drive providing main storage for the host CPU 11, or it may be a plurality of smaller disk drives arranged to perform the same function. An example of such a storage device is the SYMMETRIX line of disk arrays, available from EMC Corporation, Hopkinton, Mass. The channel 13 of the host CPU may communicate with the master storage controller 17 using the ESCON protocol, with the master storage controller performing the role of the control unit 7 (FIG. 1). Alternatively, the interface between the host CPU and the master storage controller 17 can be implemented using any of a number of other protocols, such as SCSI or Bus and Tag (B&T), which is an IBM standard.

The data stored on storage device 15 may be crucial to the operation of host CPU 11. Therefore, a contingency solution is desirable in the event that a problem is experienced with storage device 15, to ensure that the stored data is not lost and to minimize the risk of CPU 11 being down due to problems with the storage device. Potential problems with storage device 15 can include hardware and software errors that may make stored data unrecoverable, as well as catastrophic events such as an earthquake or other natural disaster that could result in the destruction of the storage device.

One solution for protecting the data stored in storage device 15 is to mirror the data in another storage device. FIG. 2 illustrates such a system, wherein the master storage controller 17 is coupled to a slave storage controller 19 and an associated storage device 22. As data is written to storage device 15, it can also be written to storage device 22. If storage device 15 is destroyed or experiences an error that renders stored data unrecoverable, the data can be retrieved from the mirroring storage device 22. As shown in FIG. 2, the slave storage controller 19 and storage device 22 can also serve as the main storage system for another host CPU 23, to which the storage system is coupled via a channel 25. Alternatively, the slave storage system can be dedicated solely to mirroring the data stored in the master storage system, without being coupled to another CPU.

The level of protection provided by the system shown in FIG. 2 is enhanced when the mirroring storage system (controller 19 and device 22) is disposed at a location remote from the main storage system (controller 17 and device 15), so that if a catastrophe occurs that destroys the main system, the likelihood of the mirroring storage system also being destroyed is greatly decreased. Thus, one illustrative application for the present invention is to implement the link 21 between the master and slave storage controllers 17 and 19 to enable the slave controller to be disposed a relatively long distance away from the master controller.

To enable communication between the master and slave storage controllers 17 and 19 over data link 21, a protocol was adopted. As stated above, in the remote mirroring storage application for the present invention, the storage controllers may communicate with their respective CPUs using the ESCON protocol. Thus, master storage controller 17 may be an ESCON compatible device that communicates over link 20 with the channel 13 of its host CPU using the ESCON protocol. Similarly, slave storage controller 19 may also be an ESCON compatible device so that in the configuration shown in FIG. 2 in which it is coupled to a second host CPU 23, the ESCON protocol is used to communicate over data link 27 with channel 25.

Figure 3:
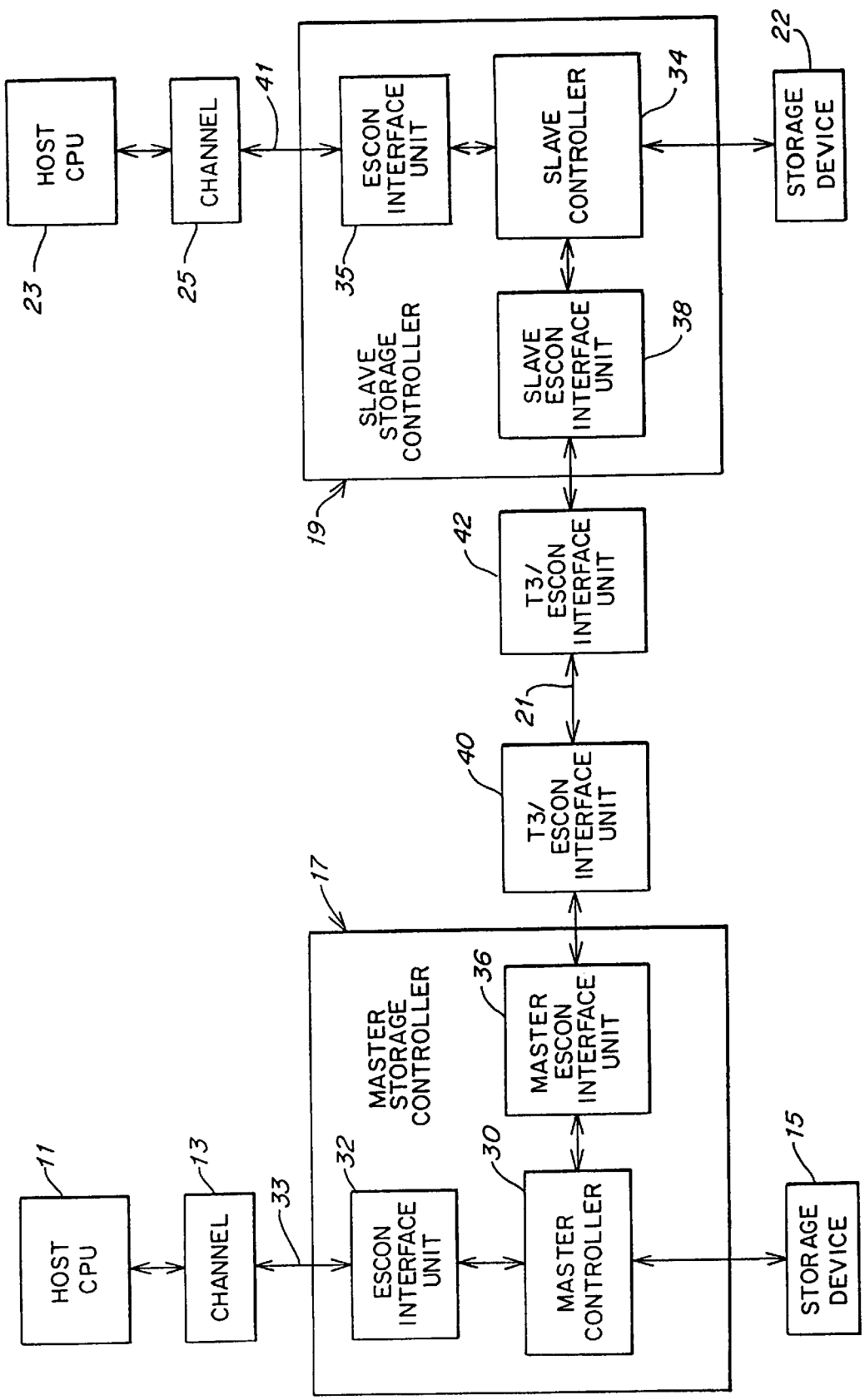
FIG. 3 is a block diagram of the system of FIG. 2 including interface units to implement the present invention.

The organization of each of the master and slave storage controllers and its ability to communicate with its respective channel (i.e., respectively channels 13 and 25 in FIG. 2) using the ESCON protocol is illustrated in FIG. 3. Master storage controller 17 includes a master controller 30, and an ESCON interface unit 32 that interfaces the controller with channel 13 over link 33. Together, the controller 30 and ESCON interface unit 32 perform the functions of the control unit 7 (FIG. 1) in the ESCON environment, enabling communication between host CPU 11 (FIG. 3) and storage device 15 (FIG. 3) using the ESCON protocol. Similarly, in the embodiment of the invention wherein the slave storage controller 19 is coupled to a local host CPU 23 (FIG. 3), the slave storage controller includes a slave controller 34 and an ESCON interface unit 35 that together perform the function of control unit 7 (FIG. 1) in enabling host CPU 23 and storage device 22 to communicate using the ESCON protocol over link 41. Although the links 33 and 35 between the storage controllers and their associated channels each is shown as a single path in FIG. 3, it should be understood each can include a number (e.g., six-eight) of parallel communication paths, as discussed below in connection with FIG. 3a.

Because each of the master and slave storage controllers typically has the capability of communicating with the channel of its local CPU using the ESCON protocol, it is desirable to also implement the communication link 21 between these storage controllers using an ESCON based protocol. Thus, in the embodiment of the present invention shown in FIG. 3, the master and slave storage controllers 17 and 19 are respectively provided with master and slave ESCON interface units 36 and 38, each of which is coupled to communication link 21. When data is transferred between the master and slave storage controllers, master ESCON interface unit 36 performs the role of the channel 3 (FIG. 1) in the ESCON environment, and slave ESCON interface unit 38 performs the role of control unit 7 (FIG. 1), enabling the master and slave storage controllers to communicate over communication link 21 using the ESCON protocol.

In the exemplary application of the present invention discussed above relating to the remote mirroring storage system, each of the CPUs is described as communicating with its associated storage device using the ESCON protocol. However, it should be understood that the invention is not limited in this respect. The present invention is directed to establishing communication between two remotely disposed devices over a public communication network, and when used to implement a remote mirroring storage system, is not limited in any respect to the protocol used to communicate between each CPU and its associated storage device. As discussed above, the protocol for communicating between the CPUs and their respective local storage devices can be any of a number of different protocols, e.g., SCSI or B&T.

As stated above, conventional dedicated ESCON links are generally known by those skilled in the art to be limited to approximately 60–80 km, even with appropriate repeaters. To maximize the protection provided by the remote mirroring data storage facility against data loss resulting from destruction of the main storage facility, and to provide increased flexibility in the manner in which the system can be configured, it is desirable to provide a link 21 that enables the slave storage controller 19 and its associated storage device 22 to be disposed at distances greater than 80 km from the master controller 17 and storage device 15, and yet be implemented using pre-existing public communication channels.

In one embodiment of the invention, a data communication line of the type leased by telephone service companies is used to implement the data link 21 between the master and slave storage controllers. Examples of such a data communication line include the family of T-carriers available in North America (e.g., T1, T3 and T5) and the family of CEPT communication links available in Europe (e.g., CEPT-1 and CEPT-3). For the purpose of illustration, the link 21 is discussed below as being implemented using a T3 line. However, it should be understood that the present invention is not limited to use with any particular type of data communication line, and can be used with any type of communication channel provided by a common carrier and operable within a public communication network.

T3 is a service provided by telephone service companies in which a subscriber pays a flat fee to lease exclusive use of a data communication link between two locations. The T3 line employs existing telephone lines, satellite links, etc. to provide high speed data transmission between the two points requested by the subscriber within the public communication network. Other high speed data transports are available from providers for use over public communication networks. It should be apparent that by using T3 or some similar available service to implement the data link 21 in a system such as the one shown in FIG. 3, the expense and time that would be incurred in implementing a conventional dedicated ESCON link between the master and slave storage controllers is avoided. Furthermore, the limitation on the distance over which dedicated ESCON links can extend is overcome, enabling link 21 to be extended for significantly greater distances, thereby providing increased flexibility in implementing a user's desired configuration and providing enhanced protection in the event of a natural disaster.

The master and slave ESCON interface units 36 and 38 shown in FIG. 3 are independent of the particular transmission medium used to implement communication channel 21. Therefore, depending upon the transmission medium used, it may be desirable to provide an additional interface unit between each of the storage controllers and the transmission medium, as discussed below. For the illustrative embodiment shown in FIG. 3 wherein communication channel 21 is implemented as a T3 line, T3/ESCON interface units 40 and 42 are provided to respectively interface the master and slave storage controllers 17 and 19 to the T3 line. A device for implementing the T3/ESCON interface units 40 and 42 is available from Data Switch Corporation, One Water View Drive, Shelton, Conn., and is sold under the model name 9800 MAX. This device is also capable of interfacing the storage controllers with a T1 line, as well as CEPT-1 and CEPT-3 lines.

As stated above, the present invention is not limited to any particular transmission medium. Thus, the particular type of interface unit used to interface the storage controllers to the communication channel 21 will vary depending on the transmission medium used for the application.

Figure 3A:
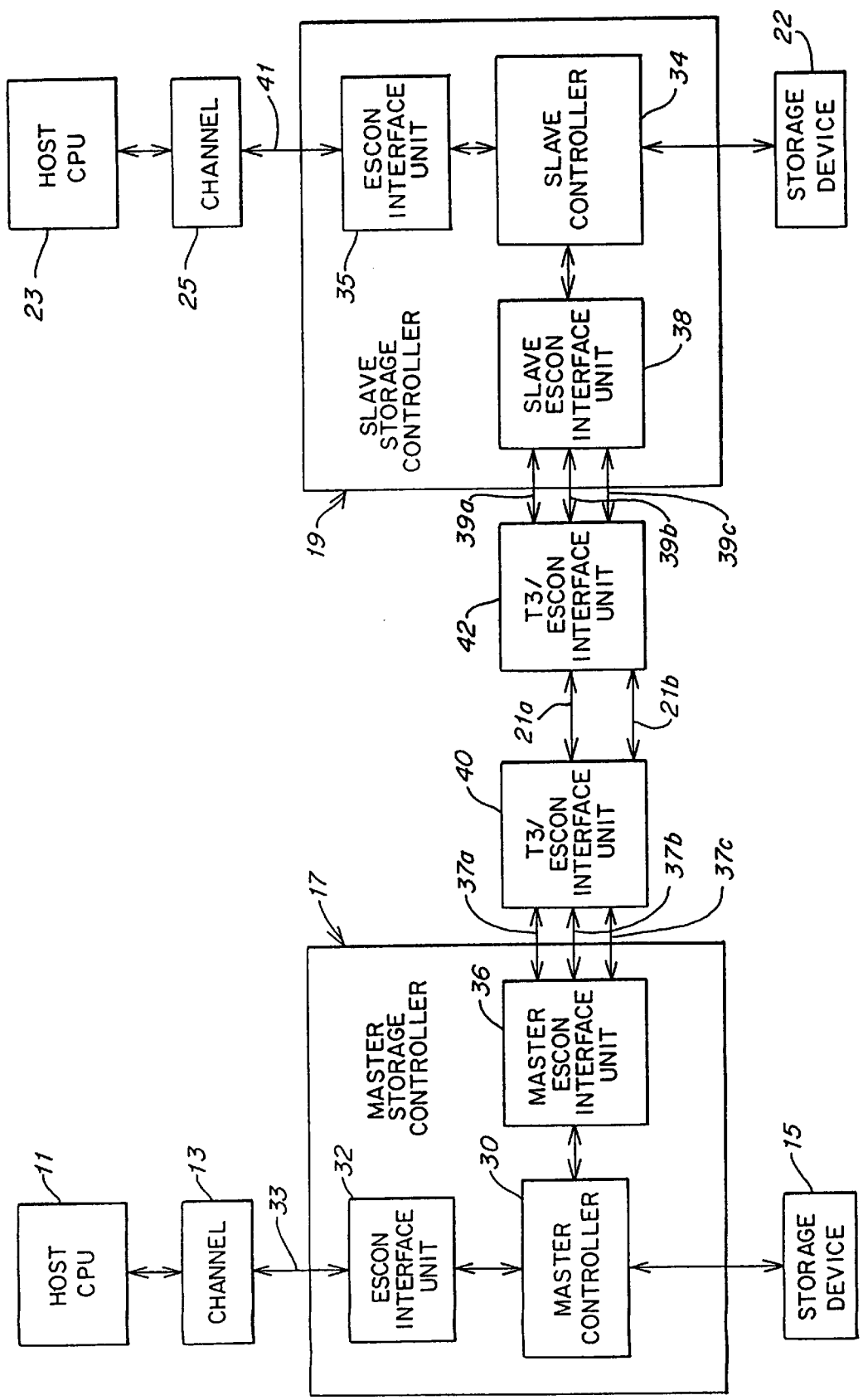
FIG. 3a is a block diagram of an alternate embodiment of the system of FIG. 3, with multiple communication paths being disposed between the master and slave devices.

Although the master and slave storage controllers are shown in FIG. 3 as being coupled by a single communication channel 21, it should be understood that communication between the remotely disposed devices can be carried out over a number of parallel communication channels, such as channels 21a and 21b shown in FIG. 3a. Just as storage device 22 is provided to mirror data contained in storage device 15 in the event of failure of device 15, communication channels are also susceptible to failure. Thus, multiple channels 21a and 21b can be used for fault tolerance reasons to decrease the likelihood of the system going down due a problem in a single communication channel, as well as to increase system bandwidth. Although two channels 21a and 21b are shown in FIG. 3a, any number (e.g., one, two, three or four) of parallel communication channels can be provided between the remote devices.

Multiple communication links 37a–c and 39a–c can also respectively be provided between the master and slave ESCON interface units and their corresponding T3/ESCON interface units 40 and 42. As shown in FIG. 3a, the number of communication links between an ESCON interface unit (e.g., 36 and 38) and its T3/ESCON interface unit need not correspond identically to the number of communication channels 21 between the two T3/ESCON interface units. Each T3/ESCON interface unit 40 and 42 may multiplex data, over the one or more communication channels 21a–21c, received from its respective communication link (37a–37c or 39a–39c). The data transmitted will then be demultiplexed on the receiving side of the data transmission. Thus, if the master ESCON interface unit 36 is the transmitting or sending unit, the data will be multiplexed for transmission on communication channels 21 and demultiplexed for receiving slave ESCON interface unit 38, and vice versa. This multiplexing may be performed using commercially available TDM multiplexing or other known multiplexing techniques. Load balancing capability may also be provided in the T3/ESCON interface units 40 and 42. For example, if three communication links 37a–37c are provided between master ESCON interface unit 36 and T3/ESCON interface unit 40, and two communication channels 21a–b of differing bandwidths are provided between T3/ESCON interface units 40 and 42, interface unit 40 balances the loads transmitted over channels 21a and 21b to make the best use of available bandwidth, without spreading the load necessarily evenly among the communication channels 21a–21b. In addition, while interface units 36 and 38 each is shown in FIG. 3a as a single unit, it is to be understood that units 36 and 38 each may comprise more than one of such interface units within storage controllers 17 or 19, respectively. This is for the purposes of redundancy if one ESCON interface unit fails and to provide greater throughput of data from master controller 30. In this event, data communicated over communication channel 21 of FIG. 3 may be multiplexed from the plurality of ESCON interface units. Thus, the present invention contemplates the use of one or a plurality of communication channels, one or a plurality of communication links and one or a plurality of master ESCON interface units.

As will be appreciated from the discussion below, when data is transferred between devices using the ESCON protocol, information frames acknowledging receipt of the data and indicating the status of the operation are required by the protocol within a certain time period. This handshaking is used to ensure that transmitted data frames are not lost. When a dedicated ESCON communication link is provided between two remotely disposed devices, the propagation delay over the communication link may present problems in ensuring that acknowledgment frames will be received in the time periods required by ESCON. To address this problem, devices have been developed for interfacing two remotely disposed devices over a dedicated ESCON link. The interface devices have the capability of collecting and storing data, and of emulating the handshaking frames required between the channel 3 and control unit 7 (FIG. 1) to implement the ESCON protocol.

In accordance with the present invention, the interface units 40 and 42 disposed between the storage controllers (17 and 19) and communication link 21 do not emulate the channel 3 or control unit 7, and do not actively participate in the ESCON protocol in any way. The master and slave controllers generate all of the signals necessary to implement the protocol for communicating therebetween over communication channel 21. The interface units 40 and 42 merely interface the master and slave storage controllers to the particular communication medium used for the application.

The present invention provides several different protocols for implementing the interface between two ESCON compatible devices (e.g., the master and slave storage controllers) over a general purpose transmission medium (e.g., T3). As is explained in detail below, in one embodiment of the invention, the ESCON compatible devices communicate over the transmission medium using the ESCON protocol. In other embodiments, the ESCON protocol is modified to achieve improved performance.

The ESCON protocol supports a number of different operations between the channel 3 and control unit 7 (FIG. 1). An example of one such operation is discussed herein to illustrate the operation of devices using the ESCON protocol and the manner in which the protocol is modified in some embodiments of the invention to improve performance. However, it should be understood that the present invention is not limited to this single operation, and that each of the operations supported by ESCON is implemented in a similar fashion.

In ESCON, the transfer of data from CPU 1 to control unit 7 (FIG. 1) is referred to as a write operation, and the transfer of data from the control unit to the CPU is referred to as a read operation. Data is transferred using a maximum frame size that is negotiated by the channel 3 and control unit 7 during initialization. An example of a typical ESCON operation is a write operation of 64k bytes of data from CPU 1 to control unit 7 (FIG. 1). For purposes of the discussion below, it is assumed that the maximum frame size negotiated prior to execution of the command is 1k bytes.

Figure 4:
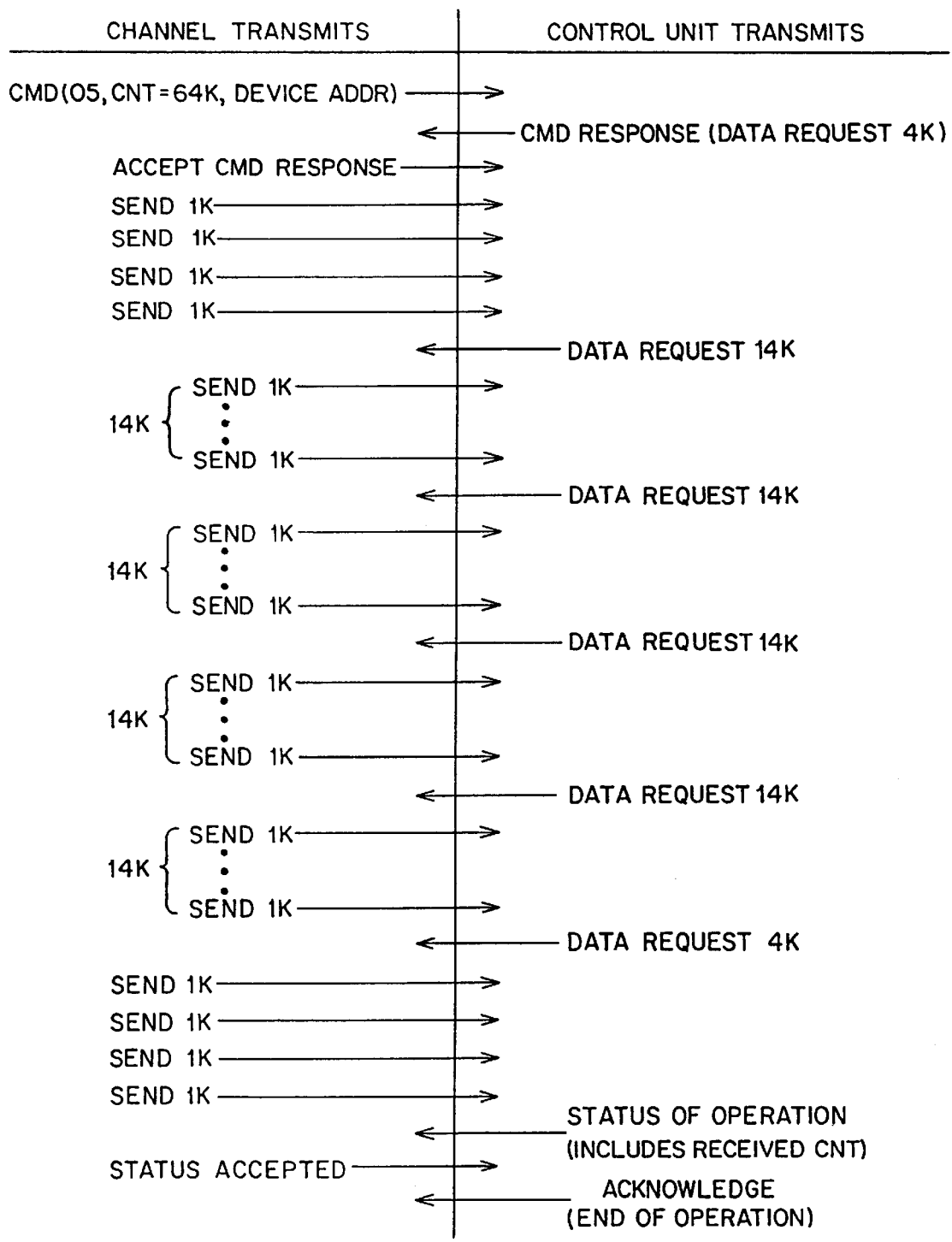
FIG. 4 illustrates a communication protocol in accordance with one embodiment of the present invention.

FIG. 4 illustrates the handshaking that occurs between the channel 3 and control unit 7 during the execution of the write 64k byte operation using the ESCON protocol. It should be understood that during read operations, the roles of the channel and the control unit in implementing the ESCON protocol are essentially reversed, such that each of the control unit and the channel has the capability of generating all of the handshaking frames required by the ESCON protocol.

Referring to the example of FIG. 4, a command frame is initially sent from the channel to the control unit specifying the operation to be performed. The command frame includes a command field including a code for the command to be executed, which is shown as "05" in the illustrative example of FIG. 4. For a write command such as this, a count (i.e., CNT) is provided specifying the number of bytes to be transferred, which is 64k in the example shown. Finally, the address of the receiving device is specified to designate which of the I/O peripherals 9 (FIG. 1) is to receive the data. When used to implement a system such as the one shown in FIG. 3 wherein only one control unit (slave ESCON interface unit 38) and a single peripheral (storage device 22) are coupled to the channel (master ESCON interface unit 36), the address necessarily designates the peripheral, and can specify a particular target location on the peripheral such as a particular disk drive area in storage device 22.

Once the command frame is received, the control unit returns a command response frame indicating that the operation can begin. When the command is a write operation, the control unit also returns a data request specifying the number of bytes of data it initially has the capacity to receive. For example, the control unit may not have sufficient buffer storage to receive all of the data to be transferred by the operation, so that the control unit could not store all of the data if it was transferred at once. By specifying the amount of data it is capable of receiving, the control unit ensures that the channel does not transmit more data than the control unit can process, which might result in a loss of data. In the example shown in FIG. 4, the initial data request specifies that the control unit can initially receive 4k bytes of data.

Once the command response and data request are received by the channel, the channel transmits an accept command response frame to the control unit along with the requested 4k bytes of data, which are transmitted in separate frames of 1k bytes each as specified by the negotiated maximum frame size. Once the last of the 4k frames is received by the control unit, the control unit transmits a second data request, requesting the amount of data that it has the capacity to receive at that time, specified as 14k bytes of data in the example shown in FIG. 4. The channel responds to receipt of the data request by transferring the requested 14k bytes of data in fourteen separate frames of 1k bytes each. In this manner, through the issuance of separate data requests, the control unit controls the pacing of the data frames transmitted from the channel during the write operation, ensuring that the control unit has the capacity to process each received data frame so that none is lost.

In the example shown in FIG. 4, the last data request issued by the control unit requests 4k bytes of data. After the last frame of 1k bytes is received by the control unit, the control unit transmits to the channel a status of operation frame, which includes information indicating the number of data frames received by the control unit. The channel checks the received count specified in the status of operation frame to ensure that it equals 64k, indicating that no data frames were lost. After the status of operation frame is checked by the channel, the channel returns a frame indicating that the status was accepted. Finally, after the status accepted frame is received by the control unit, the control unit returns an acknowledge frame to the channel which ends the operation.

As should be appreciated from an examination of FIG. 4, the ESCON protocol requires a significant amount of handshaking between the channel and control unit. A number of command frames, data requests, status indications, acceptance frames and the acknowledge frame (collectively "transactions") are transmitted in addition to the data frames, thereby decreasing the performance of the system when executing the operation. As illustrated below, the magnitude of the performance degradation due to this handshaking varies depending upon the propagation delay through the transmission medium between the channel and control unit.

For example, if it is assumed that the transmission rate through the medium that implements the data link between the channel and control unit is one data frame of 1k bytes in 55 $\mu$sec, and the propagation delay through the transmission medium is 25 $\mu$sec (equal to approximately 5 km for a fiber optic cable having a propagation delay of approximately 5 $\mu$sec/km), the total data transferral time for the operation of FIG. 4 is 3520 $\mu$sec (64×55 $\mu$sec), the total propagation delay for the six data transfers is 150 $\mu$sec (6×25 $\mu$sec), and the total propagation delay for all of the transactions is 250 μsec (10×25 μsec), with no propagation delay being attributed to the accept command response transaction because it is transferred along with the first block of data. Thus, the total time to execute the operation is 3920 μsec. The handshaking required by the ESCON protocol results in ten transactions, the time penalty for which accounts for approximately 6.5% of the total time for the operation using the assumptions provided above.

As the distance between the channel and control unit is increased, the propagation delay through the transmission medium also increases, resulting in a significant increase in the percentage of the total operation time attributable to the transactions. For example, if it is assumed that the propagation delay through the transmission medium is increased by a factor of ten to 250 μsec, then the time for the total operation includes the same 3520 μsec for data transmission through the medium, 1500 μsec attributable to propagation delay for the six data transfers across the data link (6×250 μsec), and 2500 μsec attributable to propagation delay of the transactions across the data link (10×250 μsec), resulting in a total operation time of 7520 μsec. Thus, making these assumptions, it is seen that the time penalty due to propagation delay associated with the transactions increases to over 33% of the total operation time.

As seen from the foregoing, as the propagation delay through the transmission medium increases, performance degradation of the operation due to the transactions employed by the ESCON protocol greatly increases. Therefore, in a number of alternate embodiments of the present invention, communication between ESCON compatible devices over a general purpose data link (e.g., T3) is performed using protocols specifically developed by the applicants. These protocols are similar in some respects to ESCON. However, in these alternate embodiments of the invention, the ESCON protocol has been modified to reduce the number of transactions between the channel and control unit, thereby increasing performance.

Figure 5:
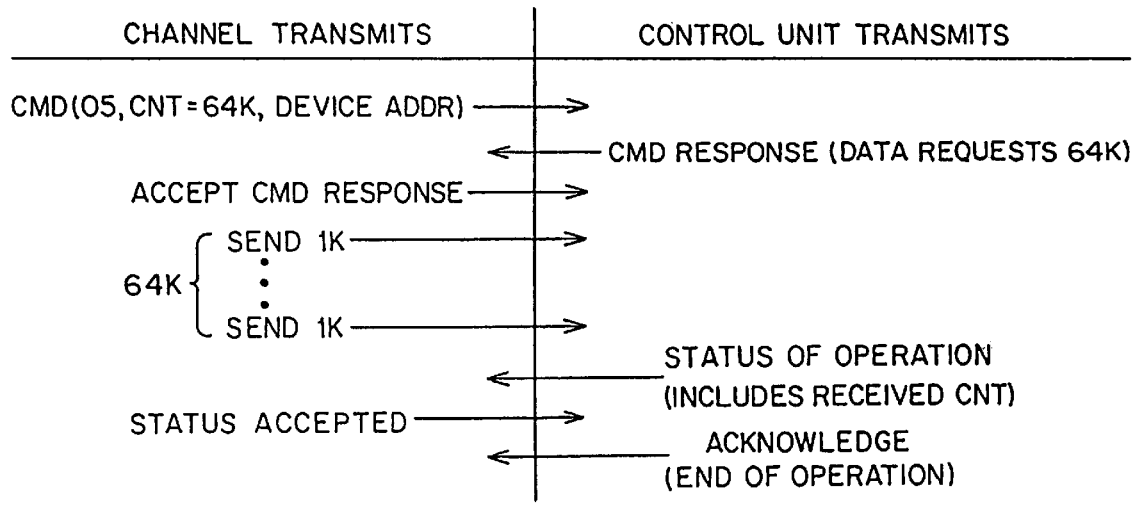
FIG. 5 illustrates an alternate communication protocol in accordance with another embodiment of the present invention.

In one embodiment of the invention illustrated in FIG. 5, a modified protocol is employed wherein data requests are not limited to the current capacity of the control unit. Rather, when a write command frame is received from the channel, the control unit simply requests that all of the data frames for the operation (e.g., 64k bytes in the example of FIG. 5) be transferred in a single data transmission. As used herein, the reference to a single data transmission indicates that the transmitted information (e.g., data frames, command frames, acknowledgment frames or status frames) is transmitted as a block that requires only one propagation delay through the transmission medium between the channel and the control unit. There may be gaps in the transmitted frames, but since the transmission of each frame in the block is not dependent upon the receipt of any frame from the receiving device (i.e., channel or control unit), any gap in the block of frames transmitted in a single data transmission is less than, and independent of, the propagation delay through the transmission medium.

It should be immediately apparent that the modified protocol of FIG. 5 provides for improved performance in relation to the embodiment of FIG. 4 through the reduction in the number of transactions and separate data transmissions required. Using the example provided above wherein the transmission time for 64k bytes of data through the transmission medium is 3520 μsec and the propagation delay over the data link is 250 μsec, the total time for the write operation using the protocol of FIG. 5 is 3520 μsec for data transmission, 250 μsec for the propagation delay of the single data transmission and the accept command response frame that is transmitted therewith, and 1250 μsec (i.e., 5×250 μsec) for propagation delay attributable to the remaining five transactions, resulting in a total operation time of 5020 μsec, and a 33% performance improvement over the protocol of FIG. 4. This improvement results from the reduction in the number of separate data transfers, as well as the reduction in the number of transactions. The penalty incurred due to propagation delay associated with the transactions falls to approximately 25% in this example using the protocol shown in FIG. 5.

It should be appreciated that the increased performance achieved by the protocol of FIG. 5 results from modifying the ESCON protocol so that the receiving device (i.e., the control unit for the write operation of FIG. 5) does not maintain control over the pacing of the data transfer, but rather, simply requests that all the data for the operation be transferred at once. In a conventional system wherein a dedicated ESCON link is provided between a channel and control unit, the protocol of FIG. 5 may have resulted in significant errors and data frame loss. For example, if the control unit in the example of FIG. 5 has buffers capable of storing only 14k bytes, the receipt of any number of data frames in excess of 14k bytes at a rate exceeding that at which the control unit can process received data frames would result in lost frames. A conventional dedicated ESCON link may be capable of transferring data frames at a rate of approximately twenty megabytes/sec. Thus, if the control unit cannot process received frames at that rate, data frames would frequently be lost if the protocol of FIG. 5 was used in a conventional ESCON system. Since the ESCON protocol is typically used to handle communication between a CPU 1 and a control unit 7 as shown in FIG. 1, the loss of data frames could be a serious error, resulting in interruption of the CPU.

As seen from the foregoing, the protocol shown in FIG. 5 may not be suitable for all ESCON applications. However, this protocol is suitable for an application, such as the one shown in FIG. 3, wherein the rate of transmission over the communication link 21 between two ESCON compatible devices is less than or equal to the rate at which the ESCON compatible devices can process received data frames. For example, a T3 data line transfers data at a rate of approximately 4.4 megabytes/sec. A storage controller such as the master and slave controllers in FIG. 3 can typically process received data frames at a significantly faster rate (e.g., 15–20 megabytes/sec). Therefore, when data is transferred between the master and slave storage controllers in the embodiment of FIG. 3, a data request for the entire amount of data for the operation can be issued without a significant risk that data will be lost, because the receiving controller can process the received data frames at a rate that exceeds that at which the communication medium can transfer them.

Although the risk of data frame loss may be small when the protocol of FIG. 5 is used in an application wherein the coupled devices can process received data frames at a rate that exceeds the transmission rate of the communication link, the removal of the ability of the receiving device to pace the data transfer (as illustrated in FIG. 4) may occasionally result in some data frames being lost when the receiving device is busy and cannot process received frames at its maximum rate. However, in a system such as the one shown in FIG. 3, the loss of data frames between the master and slave storage controllers is not as significant an error as when data is lost when transferred from one of the host CPUs to its associated storage device. Particularly, the lost data can simply be retransmitted between the master and slave storage controllers, without interrupting operation of the CPUs. Thus, although some data frames may be occasionally lost using the protocol of FIG. 5, the penalty incurred to recover from such an error may be relatively insignificant for some applications, and may be outweighed by the performance gains provided by this protocol.

Error checking and recovery is conventionally performed in one of two ways. When a large block of data is transferred (e.g., 64k bytes in the examples above), error checking and recovery can be done solely on the block level, such that if an error occurs in any of the transmitted bytes of data in the block, the entire block is re-transmitted. This type of error checking is generally employed with a very reliable transmission medium through which errors are infrequent. Alternatively, error checking and retransmission can be performed on a lower level (e.g., the 1k byte frames discussed in the example above). Thus, if the transmission medium is relatively unreliable so that more frequent errors occur, only a smaller frame of data need be re-transmitted to recover from the error, so that a large performance penalty is not incurred in re-transmitting the entire block.

Dedicated ESCON links are very reliable, so that error checking and recovery is generally not performed at a low level on those links. However, the present invention is capable of being performed using many different types of transmission media, some of which (e.g., T3) may be less reliable than a dedicated ESCON link. Therefore, in accordance with one embodiment of the invention, the ESCON interface units 40 and 42 (FIG. 3) perform error checking and recovery at a lower level than the blocks of data transferred by the ESCON commands, so that when errors occur, a significant performance penalty is not incurred in re-transmitting the entire block of data.

Figure 6:
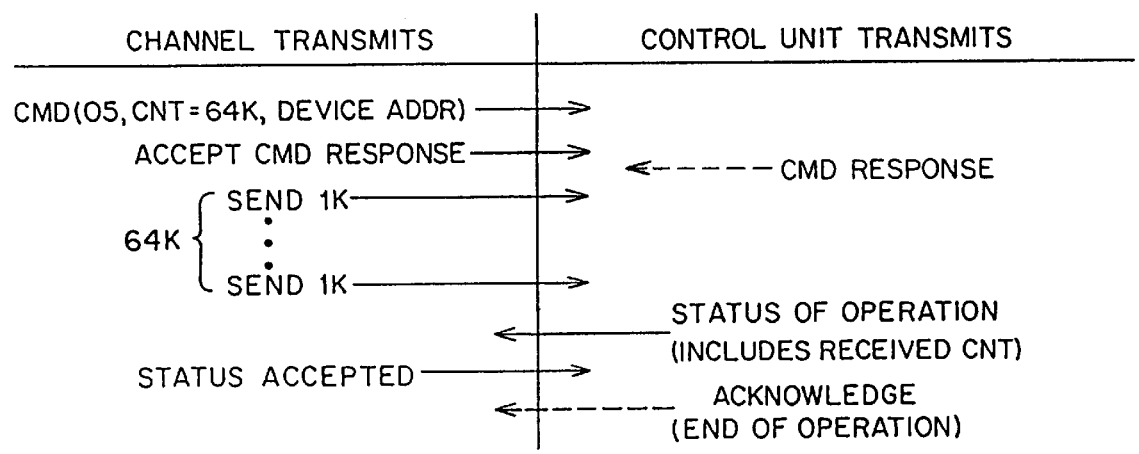
FIG. 6 illustrates a further alternate protocol in accordance with yet another embodiment of the present invention.

An additional alternate embodiment of the invention is shown in FIG. 6, wherein the number of transactions is further reduced from the embodiment shown in FIG. 5. In the embodiment of FIG. 6, the channel transfers the accept command response frame and all of the data along with the command frame in a single transmission, without waiting for the command response frame to be returned from the control unit. In this manner, two propagation delays through the transmission medium are saved, so that no performance penalty is incurred waiting for the command frame to be transmitted from the channel to the control unit, and for the command response frame to be transmitted back to the channel. The control unit may still return the command response in this embodiment. However, as discussed below, the channel need not check to verify that the command response was returned, as this handshaking is unnecessary. This is indicated in FIG. 6 by the transmission of the command response being represented as a dotted line. Since the command response frame is unnecessary, in an alternate embodiment of the invention this frame is not returned in response to receipt of a command.

In a system such as the one shown in FIG. 3, only two devices are connected together over the communication channel 21. Therefore, the ESCON compatible device that transmits a command frame (e.g., master ESCON interface unit 36 that acts as the channel in the embodiment of FIG. 3) in this system is assured that the receiving device is the intended recipient (e.g., slave ESCON interface unit 38 that acts as the control unit). Thus, when an operation is performed between the two ESCON compatible devices over the communication channel 21 using the protocol of FIG. 6, the device that initiates the operation transmits the command frame, the accept command response frame and the data in one transmission, and then simply assumes that it will be received and processed by the receiving device. If the control unit is not ready to receive data sent by the channel, the data will simply be discarded. Furthermore, if the command (i.e., the command frame and any data associated therewith) is not received or processed properly, the transmitting device will be notified via the information contained in the status of operation frame, or by the non-receipt of the status of operation frame, prompting retransmission of the command. Thus, the command response frame is not necessary and may be eliminated in the embodiment of FIG. 6.

Another difference between the protocols of FIGS. 5 and 6 is that although the acknowledge frame is sent by the control unit in FIG. 6, the channel does not wait to receive the acknowledge frame before beginning the next operation. This is indicated in FIG. 6 by the transmission of the acknowledged frame being represented as a dotted line. Thus, although the status accepted and acknowledge frames are transmitted, a savings of two propagation delays is achieved as compared with the protocol shown in FIG. 5, because after the status accepted frame is transmitted, the channel begins the next operation without waiting for the status accepted frame to arrive at the control unit and then for the acknowledge frame to be returned to the channel.

If an error occurs in an operation that results in the transmitting device (e.g., the channel in FIG. 6) not transmitting the status accepted frame, the receiving device (e.g., the control unit in FIG. 6) will not return the acknowledge frame and will continue to wait for the status accepted frame. In accordance with the embodiment of FIG. 6, if the transmitting device proceeds to a next operation and transmits a new command to the receiving device, the receiving device will report an error associated with the preceding command due to the failure to receive the status accepted frame. Thus, the error will eventually be detected upon the attempt to execute the next command. Therefore, the transmitting device need not await receipt of the command response as discussed above, and need not await receipt of the acknowledge frame before beginning the next operation.

It should be appreciated that the protocol of FIG. 6 results in a further performance improvement over the embodiment of FIG. 5 by further reducing the number of transactions. Using the parameters of the example described above in comparing the relative performance of the protocols of FIGS. 4 and 5, the time for transmission of 64k bytes of data through the transmission medium is 3520 $\mu$sec, the single propagation delay associated with transferring the data, the command and the accept command response frame across the communication link is 250 $\mu$sec, and the propagation delay for transmitting the status of operation frame is 250 $\mu$sec, resulting in a total time for the operation of 4020 $\mu$sec. This provides an approximately 23.7% improvement over the performance of the protocol of FIG. 5 for this example, and results in a reduction of the percentage of time attributable to the transactions to approximately 6.2%.

As seen from the foregoing, in some embodiments of the invention, performance improvements are achieved by modifying the ESCON protocol to reduce the handshaking required. To understand the purpose for each of the handshaking signals in ESCON, which was developed as a general purpose protocol, the standard should be reviewed in detail. However, as should be appreciated from the foregoing, for a number of applications such as those described above, not all of the handshaking signals required by ESCON are necessary, and some can be eliminated to achieve improved performance.

It should be recognized that by removing some of the handshaking levels from the ESCON protocol, error detection may occur less frequently, resulting in potentially greater recovery penalties when an error is detected. The ESCON protocol provides for a fairly sophisticated error recovery system. However, in accordance with the embodiments of the present invention shown in FIGS. 4–6, a far simpler technique is employed. Whenever an error is detected at any stage of a command, the command is simply re-executed from the beginning.

In an alternate embodiment of the inventions shown in FIGS. 5 and 6, the status accepted and acknowledge frames are eliminated when two consecutively transferred commands are directed to the same target address. When commands are chained in this manner, the receipt of a second command directed to the same target address indicates that the status of operation frame for the preceding command was received at the transmitting device (e.g., the channel in the example of FIGS. 5 and 6). Thus, transmission of the status accepted and acknowledge frames is unnecessary. Thus, for a chain of consecutively transmitted commands directed to the same target address, status accepted and acknowledge frames are sent only for the last command in the chain.

Figure 7:
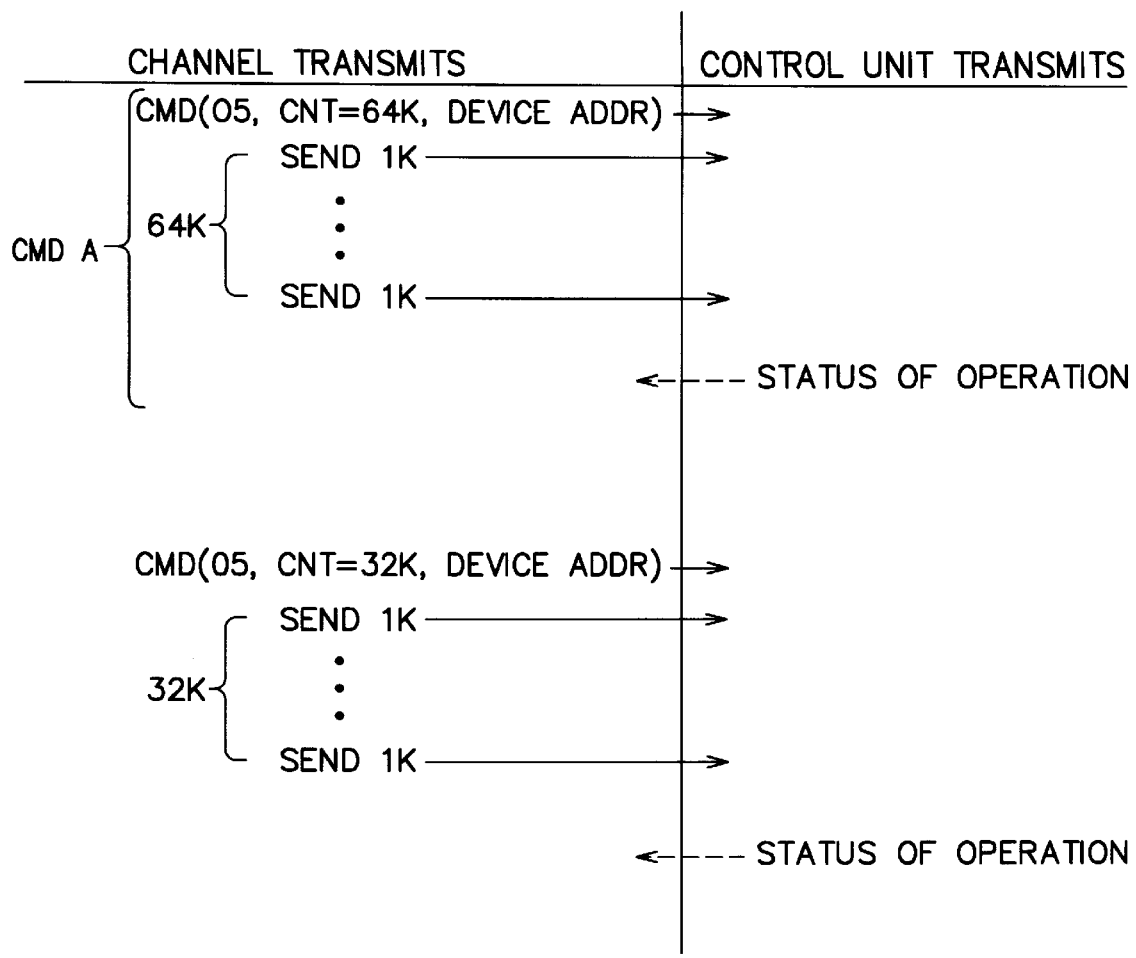
FIG. 7 illustrates an additional alternate protocol in accordance with yet another embodiment of the present invention.

In an additional alternate embodiment of the invention shown in FIG. 7, the number of transactions is further reduced from the embodiment shown in FIG. 6. As discussed above in connection with the embodiment of FIG. 6, the command response frame need not be returned from the receiving device because it is unnecessary. Therefore, as shown in the illustrative embodiment of FIG. 7, both the command response and accept command response frames are eliminated. Alternatively, these frames could still be sent by the receiving and transmitting devices respectively, but need not be checked.

Similarly, it has been found that the transmission and checking of the status accepted and acknowledge frames is not necessary for the vast majority of commands that execute without error. Therefore, in the embodiment of FIG. 7, the transmission of the status accepted and acknowledge frames has been eliminated, with the sole exception that the status accepted frame is employed in one embodiment of the present invention in an error handling routine discussed below.

In ESCON and the embodiments of the invention described above, the status accepted frame indicates that the status of operation frame has been received, for example by the control unit in the examples discussed above. The acknowledge frame confirms that the device that sent the status accepted frame is aware that it was received by the other, and indicates that the operation over the link has completed. The acknowledge frame includes information indicating that the device sending the acknowledge frame (the control unit in the examples discussed above) is disconnecting from the link, so that operations between the channel and a different control unit can be initiated.

In the embodiment of the present invention wherein only a single control unit is associated with the channel (e.g., master and slave storage controllers 17 and 19 of FIG. 3), the control unit need not be disconnected from the link at the completion of an operation. Receipt of the status of operation frame indicating that the operation was processed successfully at the receiving device is sufficient to indicate that the operation has been successfully completed. Therefore, although the status accepted and acknowledge frames are employed in some embodiments of the invention because they provide an additional level of confidence that both the channel and the control unit have completed the operation, they are not necessary. In the embodiment of FIG. 7, rather than employing a number of handshaking steps to ensure that an operation and its status checking are progressing successfully, an assumption is made when the operation is begun that it will complete successfully. If it is discovered at the end of the operation that an error occurred, the operation is re-executed in accordance with an error recovery routine discussed below.

The number of transactions is further reduced in the embodiment of FIG. 7 because the transmitting device (i.e., the channel for the illustrative commands shown) does not wait for the receipt of the status of operation frame before moving to execution of the next command. Rather, the handshaking between the channel and control unit relating to the sending of the status of operation frame is performed later, simultaneously with the execution of additional commands involving the transfer of data between the channel and the control unit over the link. This is represented in FIG. 7 by the transmission of the status of operation frame being represented in dotted lines.

When multiple commands (including a command frame and any associated data) are executed consecutively (e.g., commands CMDA and CMDB in FIG. 7), the embodiment of FIG. 7 provides a performance improvement over that of FIG. 6 because no performance penalty is incurred waiting for the status of operation frame to be received at the transmitting device before beginning execution of the next operation. Thus, the consecutively executed commands can be transferred in a single data transmission requiring only one propagation delay through the transmission medium for each group of consecutively executed instructions. As used herein, the reference to a single data transmission for multiple commands indicates that the commands are transmitted as a block that requires only one propagation delay through the transmission medium between the channel and the control unit. There may be gaps between the commands or frames within one of the commands, but since the transmission of each frame in the block is not dependent upon the receipt of any frame from the receiving device (i.e., channel or control unit), any gap in the block of commands transmitted in a single data transmission is less than, and independent of, the propagation delay through the transmission medium.

With the embodiment of FIG. 7, the larger the number of commands in the group, the lower the average propagation delay per command. If the group of consecutively executed commands is large enough to maintain an interrupted flow of commands and data through the transmission medium without any gaps between consecutively executed instructions, the average propagation delay per command can be reduced to effectively zero.

The embodiment of FIG. 7 is well-suited to use with a transmission medium that is not only bidirectional, but also full-duplex so that the status of operation frame can be transmitted from the receiving device (e.g., the control unit in FIG. 7) to the transmitting device (e.g., the channel in FIG. 7) at the same time that additional commands and data are being transmitted over the link. Thus, for each group of commands that is executed consecutively in a single data transmission, only one propagation delay is incurred for the entire group.

Referring to the illustrative system configuration shown in FIG. 3a, it should be understood that generally only one input/output operation (e.g., a writing of data from the master storage controller 17 to the slave storage controller 19) can be executed at a time over each physical link 21a, 21b between the master and slave. However, by allowing a number of commands that implement input/output operations to be "open" (i.e., begun by transmission of the command but not yet completed by receipt of the status of operation frame) simultaneously, the protocol of FIG. 7 enables multiple virtual links to be established over each physical link 21a, 21b between the master and slave controllers 17 and 19.

In one embodiment of the invention, the protocol shown in FIG. 7 is implemented by providing two entities in the transmitting device. One entity controls the command currently being transmitted between the channel and control unit, and the other (referred to hereafter as the status checking entity) completes the handshaking and error checking with respect to other open commands previously transmitted over the link but not yet completed by the receipt of the status of operation frame. In the illustrative system shown in FIG. 3a, each of these entities is implemented in the master controller 30 via a programmed processor or by dedicated hardware as discussed below.

Using the protocol shown in FIG. 7, the channel can transmit a number of commands without waiting for receipt of status of operation frames. For example, again making reference to the illustrative system of FIG. 3a, a first command can be executed that writes data to a first address in the storage device 22 associated with the slave storage controller 19, and a second command that writes data to a different address on the storage device 22 can be executed immediately thereafter. The channel can transmit both commands along with their accompanying data in a single data transmission requiring only one propagation delay through the transmission medium between the master and the slave. After each command and its associated data is transferred from the master storage controller, responsibility for monitoring the successful completion of the command is passed to the status checking entity which waits for the status of operation frame to be received for each command, ensuring that the command has successfully completed execution. If a problem or special condition is encountered with any of the commands resulting in a failure to receive the status of operation frame, error recovery is performed in a manner discussed below.

The protocol shown in FIG. 7 provides improved performance by allowing multiple commands, with their associated data transfers, to be accomplished in a single data transmission, without incurring the additional propagation delay that would be required to await receipt of a status of operation frame before executing a next instruction. Thus, in the illustrative system of FIG. 3a, the master storage device can write in consecutive commands to two different addresses on the storage device 22. In accordance with one embodiment of the invention, commands to the same target volume are synchronized, such that a later command to the same volume will not be executed until a status of operation frame has been received for a command previously transmitted to that volume. The term "volume" is used herein in the conventional IBM sense to identify separate devices controlled by the control unit, or areas on a single device that are logically separate and identified by unique device addresses. The synchronization of two commands directed to the same target volume is beneficial where two successive commands may be interdependent. For example, in the illustrative system of FIG. 3a, a first command could search for a particular area on the slave storage device to be written, or could define the format to be used for a subsequent write, and the next command could actually write the data. If the first command does not execute properly, the second command (i.e., the one that actually writes the data) may write data to the wrong location or in the wrong format.

Although synchronization between commands that share the same target address provides the above-described advantage, it should be understood that the invention is not so limited, and that for some applications, synchronization may not be required even for two commands that target the same device.

It should be understood that moving the handshaking level provided by the status of operation frame into the background in the embodiment of FIG. 7 may result in potentially greater recovery penalties when an error is detected, because execution of a number of subsequent instructions will generally have begun before an error is detected. As with the embodiments discussed above, error recovery can be achieved by re-executing a group of commands from the beginning when an error is detected with any of the commands. If the command does not successfully execute when retried, the link between the channel and control unit can be reinitialized and then the group of commands can be retried again. For example, in the illustrative system of FIG. 3a, the master storage controller has the capability of bringing down the link with the slave storage controller, and re-executing any group of commands in which an error was detected.

In one embodiment of the invention, a technique is preferably employed so that when the channel or control unit receives a status of operation frame, it is able to identify which of the commands the frame relates to. In one embodiment of the invention, each of the status of operation frames includes the target device address associated with the command. In this embodiment of the invention, commands to a common target address are synchronized by refraining from beginning any later commands to a target address until a status of operation frame has been received in connection with all commands previously transmitted to that target address. Thus, the device address included in the status of operation frame uniquely identifies only one command open at any given time.

As with the embodiment of FIG. 6, if the receiving device (e.g., the control unit in FIG. 7) is not ready to receive data sent by the transmitting device (e.g., the channel in FIG. 7), the data will simply be discarded and the transmitting device will be notified via the information contained in the status of operation frame, or by the non-receipt of the status of operation frame, prompting retransmission of the command.

One illustrative embodiment of an error handling routine in connection with the protocol of FIG. 7 will now be described. In this description, a number of fields in the status of operation frame are described making reference to terminology defined by IBM in connection with the ESCON protocol. However, it should be understood that the invention is not limited in this respect, and that the status frames used in connection with this illustrative error handling routine can be implemented in a number of other ways.

As discussed above, the protocol of FIG. 7 is implemented in one embodiment of the invention by providing two entities, i.e., an entity that controls the command being transmitted between the channel and control unit, and another that checks for the return of status of operation frames for other open commands previously transmitted over the link but not yet completed. In this embodiment of the invention, when a new command is transmitted from the channel or control unit, the status checking entity associated therewith sets a timer establishing a time period within which it is expected that a status of operation frame will be received if the command is executed properly. If the status checking entity determines that the timer has expired for any of the open commands that it monitors without receipt of a corresponding status of operation frame, the status checking entity causes that command to be re-executed.

As should be appreciated from the foregoing, the setting of a timer for the status of operation frame is all that is required to handle one of the error conditions that could potentially occur using the protocol of FIG. 7. In particular, if a command transmitted from one of the channel or control unit is not received by the other due to a problem with the transmission medium, the intended recipient will obviously not respond by sending a status of operation frame. Therefore, the timer on the sending device will eventually expire, resulting in re-transmission of the command.

The other general types of error or other special conditions arise when the command is transferred over the transmission medium to the receiving device (e.g., the control unit in the examples above), but the receiving device or a target address associated therewith is busy or otherwise unable to process the command (e.g., if the received data is corrupted). In the IBM ESCON protocol, when such a condition occurs, the receiving device sends a status of operation frame that includes a UNICHECK field that identifies that a special condition has occurred at the receiving device. For the ESCON protocol in the example command shown in FIG. 4, the status of operation frame including the UNICHECK status would be transferred to the channel, which would then ask the control unit to send thirty-two bytes identifying the nature of the special condition. In accordance with one embodiment of the present invention, two propagation delays are saved because the device that detects the special condition automatically sends a status of operation frame that not only specifies that a special condition (i.e., a UNICHECK) has occurred, but also includes the substantive information (e.g., the thirty-two bytes of status in the ESCON protocol) identifying the nature of the special condition.

The types of error or special conditions that result when a command is successfully transferred across the transmission medium can be generalized in the following three classes, each of which is discussed below along with the manner in which these conditions are handled in accordance with one embodiment of the present invention: (1) the target address at the receiving device may be unable to process the command at the time received; (2) the receiving device (as opposed to the particular target address associated therewith) may be busy and unable to process the command at the time received; (3) a problem (e.g., corrupted data) may be detected with the data transferred over the transmission medium.

Dealing with the first of these three conditions, and referring to the illustrative system shown in FIG. 3a as an example, the master storage controller 17 may transfer a write command to a particular target volume on the slave storage device 22. If the target volume is in the process of handling a previous write operation or is otherwise unable to process the write operation when received, the slave controller 19 will return a status frame to the master controller 17 indicating that the received command is not being processed normally. Using the conventional IBM status fields for illustrative purposes as mentioned above, the status of operation frame returned from the slave storage controller 19 would indicate a "command retry", which includes a status field specifying a "channel end" condition, but not a "device end" condition. The channel end condition indicates to the transmitting device that the phase of transmitting data is over. The device end condition, when specified, indicates that the receiving device is ready to accept the next command. Thus, the command retry status indicates to the transmitting device that the command will need to be re-sent, but does not indicate that it be re-sent immediately. In addition, the status of operation frame sent by the slave storage controller 19 would also indicate that the target volume address for the command be disconnected from the channel, indicating that no further commands should be sent to that target volume address until its status is updated.

In response to the receipt of a status of operation frame that does not specify a "device end" and that indicates that the target volume should be disconnected from the link, the transmitting device (e.g., the master storage controller 17 acting as the channel in the example discussed above) will not send any additional commands to that target volume until an additional status of operation frame is received indicating that the target volume has been reconnected and is prepared to receive additional commands. Thus, the receiving device (e.g., the slave controller 19 acting as the control unit in the example above) then has time to process its previously-received commands and data and to ready itself to receive additional commands.

It should be understood that the command sent to the receiving device that resulted in the status of operation frame indicating the special condition discussed above is simply discarded at the receiving side. However, the other commands that follow, potentially in an uninterrupted group of commands with no gaps therebetween as discussed above, are processed in the normal fashion. Thus, only the command directed to the particular target address is flushed, with the commands to all other target volumes being processed normally. In the illustrative example discussed above, only the particular target volume on the slave storage device 22 is disconnected from the link not the entire slave controller 34 or slave ESCON interface unit 38 that acts as the control unit.

When the target volume of the command that resulted in the UNICHECK becomes available to receive additional commands, it notifies the transmitting device by sending another status of operation frame, this time specifying a "device end" condition, identifying to the transmitting device that the target volume is ready to receive another command. When the status checking entity of the transmitting device receives such a status of operation frame, it causes the command or command sequence in the process that initially resulted in the UNICHECK condition to be re-executed.

In one embodiment of the invention, priority is given to the command being re-executed to maximize the likelihood of the command completing successfully. Therefore, in accordance with this embodiment of the invention, after the status of operation frame specifying the device end condition is transmitted to indicate that the previously unexecuted command should be retried, the receiving device (i.e., the slave storage controller 19 in the example discussed) flushes any new commands it has stored in its pipeline or thereafter receives until it is provided with an indication from the transmitting device (e.g., master storage controller 17) that the flushing should cease and that the next command should be processed normally (e.g., the next command may initiate error recovery). In one illustrative embodiment of the invention, the transmitting device provides such an indication through the use of the status accepted frame. As indicated above, in the protocol of FIG. 7, the status accepted frame is not generally transmitted. It is used only for this special condition. When the transmitting device receives the status of operation frame specifying the device end condition that indicates that the command should be retried, the transmitting device sends the status accepted frame to the receiving device, followed by the command being re-executed. Receipt of the status accepted frame indicates to the receiving device that it should cease flushing the commands received over the transmission medium (e.g., links 21a, 21b in FIG. 3a) because the command following the status accepted frame is the command to be re-executed. The transmitting device can send along with the re-executed command a next group of commands to be executed, with each being grouped together to reduce the average propagation delay per command in the manner described above. With respect to the commands that were flushed by the receiving device (the slave storage controller 19 in the illustrative example), the timers set in the status checking entity will eventually expire for each of these commands, resulting in each of these commands being retransmitted as discussed above.

It should be understood that although priority is given to the re-execution of commands in the embodiment of the invention described above through the flushing of the other commands received prior to the status accepted frame, the invention is not limited in this respect. Thus, it is believed that the special condition handling routine could be implemented so that when a command is re-executed, the other commands are not flushed and are processed in the order received, with the re-executed command being processed in the order in which it is received at the receiving device.

Referring to the illustrative system in FIG. 3a, it should be understood that although the links 21a and 21b between the master and slave storage controllers typically transmit a number of commands that are open simultaneously, in one embodiment of the invention, the interface between the slave ESCON interface unit 38 and the slave controller 34, as well as that between the master ESCON interface unit 36 and the master controller 30, operates in a more conventional fashion on one command at a time. In the example above, after the slave storage controller 19 has sent a status of operation frame indicating a command retry for a particular target volume along with status indicating a channel end condition that disconnects that target volume from the link but not a device end, the slave storage controller 19 can continue to process an uninterrupted group of commands received over the links 21a and 21b. Thus, the interface between the slave ESCON interface unit 38 and the slave controller 34 may be busy every cycle, with data frames being sent from the interface unit 38 to the slave controller 34, and the slave controller 34 returning status information indicating whether the operation was completed properly with the target volume on the storage device 22. Thus, unlike the links 21a and 21b, the link between the slave ESCON interface unit 38 and the slave controller 34 typically operates on only one command at a time.

When the slave controller 34 determines that a disconnected target volume on which a command retry condition previously occurred is now ready to retry the command, in the special condition handling routine according to the illustrative embodiment of the invention discussed above, the slave controller 34 so specifies by sending a status of operation frame indicating a device end condition for the target volume. In accordance with one illustrative embodiment of the invention, the slave controller 34 sends the appropriate status of operation frame when it determines that the target volume is ready to retry the command. At that point, the interface between the slave controller 34 and the slave ESCON interface unit 38 cannot simultaneously be used to also transmit status for the next command in the pipeline of the interface unit 38, so that the status frame for the next pipelined command is not sent. However, in the embodiment of the special condition handling routine discussed above, the next command in the pipeline is flushed, such that no status is returned for that command.

As mentioned above, the second general type of UNICHECK condition arises when the receiving device (e.g., the slave ESCON interface unit 38/slave controller 34 in the example above) is not capable of processing the received command. This may result from the control unit being busy performing other operations directed to either the target address of the command or any other target address. Thus, this condition differs from the first condition discussed above because it is not limited solely to the target address to which the command is directed, but more generally impacts every command. Thus, in one embodiment of the special condition handling routine of the present invention, this type of UNICHECK condition is handled by disconnecting the receiving device from the link and flushing all received commands, not just those directed to the target address of the command that resulted in the UNICHECK, until the receiving device signals that it is prepared to receive additional commands.

Using the conventional IBM status fields for illustrative purposes as mentioned above, the status of operation frame returned from the slave storage controller 19 would indicate a "control unit busy" condition specifying to the transmitting device that no additional commands should be sent to the control unit until further notice. In this manner, the entire control unit (e.g., the slave ESCON interface unit 38) is disconnected from the link, rather than just a particular target address as with the first condition discussed above. Once the control unit is prepared to receive additional commands, a second status frame is sent indicating a "control unit end" condition specifying that the control unit is ready for the transmitting device to send additional commands.

In a manner similar to that discussed above in connection with the command retry condition, after the control unit sends the first status frame indicating the busy condition, the control unit flushes all commands that are in its pipeline or are thereafter received over the link. In response to the first status frame indicating the busy condition and the subsequent second status frame indicating that the control unit is prepared to receive additional commands, the channel transmits a status accepted frame, indicating that flushing of commands received over the link should cease. The transmitting device can send along with the re-executed command a next group of commands to be executed in a single data transmission to reduce the average propagation delay per command as discussed above.

The third and final general type of UNICHECK condition discussed above arises when the receiving device (e.g., the control unit or slave ESCON interface unit 38/slave controller 34) is not capable of processing the received command because of a problem that is not particular to the receiving device or any of its associated target addresses. An example of such a problem is potential corruption of the data received over the link. Like the second condition discussed above, this type of error or special condition is not limited to simply the target address to which the command that results in the UNICHECK is directed, and will more generally impact every command. Thus, in one embodiment of the special condition handling routine of the present invention, this type of UNICHECK condition is handled in essentially the same manner as the second class of situations discussed above, i.e., by disconnecting the receiving device from the link and flushing all of the received commands, not just those directed to the target address of the command that resulted in the UNICHECK.

Using the conventional IBM status fields for illustrative purposes as mentioned above, the status of operation frame returned from the slave storage controller 19 could also indicate a "control unit busy" or some other condition specifying to the transmitting device that the control unit is disconnected from the link and that no additional commands should be sent to the control unit until further notice. Once the control unit is prepared to receive additional commands, a second status frame can be sent indicating a "control unit end" or some other condition specifying that the control unit is reconnected and ready for the transmitting device to send additional commands. After the control unit sends the first status frame indicating the disconnected condition, the control unit flushes all commands stored in its pipeline and thereafter received over the link. In response to the second status frame indicating that the control unit is prepared to receive additional commands, the channel transmits a status accepted frame, indicating that the flushing of commands received over the link should cease, followed by a retry of the command that initially caused the UNICHECK condition to occur.

As should be appreciated from the foregoing, the above-described error or special condition handling routine provides one illustration of how special conditions can be handled in conjunction with the protocol of FIG. 7, wherein a group of commands is transmitted in a single data transmission, without awaiting any handshaking signals between commands indicating that each has completed successfully. However, it should be understood that the present invention is not limited to the particular error handling routines discussed above, and that other techniques for handling special conditions can alternatively be employed.

The optimal number of instructions that should be open at any one time when using the protocol of FIG. 7 will vary depending upon the configuration of the system. In general, system performance increases with the number of instructions open at any one time until the point is reached where the number of open commands keeps the link between the channel and control unit full, such that no propagation delays are incurred due to gaps between consecutive commands. However, the greater the number of commands that can be open at any one time, the greater the support facilities required. Furthermore, when error recovery is performed by re-executing all instructions subsequent to the one for which an error was detected, the larger the number of open instructions, the longer the error recovery time. Thus, depending upon the reliability of the transmission medium between the control unit and the channel, it may be desirable to maintain the number of open commands at a small enough level so that error recovery can be performed relatively efficiently.

FIG. 8 is a table useful in comparing the performance characteristics of the embodiments of FIGS. 4–6. These performance characteristics are based upon a few assumptions. First, it is assumed that the rate of data transmission through the communication link between the devices is four megabytes/sec, which is roughly the speed of a T3 line. Second, it is assumed that the propagation delay through the medium is equal to 5 $\mu$sec per 1 km, which is approximately the speed of data transmission over a fibre optic cable. Given these assumptions, the total time (T) in milliseconds for an operation across the transmission medium for any of these protocols is defined by the formula shown below, wherein BS represents the block size of the data transfer in k bytes, d represents the distance of the transmission line in kilometers, and k represents the number of propagation delays that are involved in an operation.

$$T(ms)=BS/4+(k\times 5d/1000)$$

The block size (BS) is divided by four because the rate of data transmission through the line is four megabytes/sec. Using the illustrative command depicted in FIGS. 4–6, k equals sixteen for the embodiment of FIG. 4, six for the embodiment of FIG. 5, and two for the embodiment of FIG. 6. The distance d is multiplied by five in the formula to represent the propagation delay of five microseconds per km, and is divided by 1000 to convert the unit of measure from microseconds to milliseconds.

As can be seen from an examination of FIG. 8, the reduction in the number of propagation delays (i.e., k in the formula above) in the embodiments of FIGS. 5 and 6 significantly reduces the time of an operation, particularly as the distance d through the transmission medium increases. The protocol of FIG. 7 also reduces the time of the operations from those of FIGS. 5 and 6 even further. The exact nature of the performance improvement with the protocol of FIG. 7 will vary depending on the system configuration and the number of open commands maintained at any one time. For each command, a savings of at least one propagation delay will be achieved because it is unnecessary to await receipt of the status of operation frame. Furthermore, for groups of commands transmitted without any gaps therebetween, only a single propagation delay is incurred for the transmission of the entire group. Therefore, the more successful the system is in transmitting groups of commands without gaps therebetween, the greater the performance improvement achieved using the protocol of FIG. 7.

Each device that communicates using the protocols of the present invention (e.g., the master and slave ESCON interface units 36 and 38 in FIG. 3) may include a processor that is programmed by software to generate and respond to the handshaking signals discussed herein which implement the protocols of the present invention. In one embodiment of the invention, the processors may be selected from the Motorola 68xxx family of processors. It should be understood that a number of other types of suitable processors can alternatively be used. Furthermore, although a programmed processor provides a simple and straightforward implementation of a device for communicating using the protocols of the present invention, it should be understood that such a device can also be implemented using dedicated hardware.

As discussed above, the protocols of the present invention are well suited to use with a system such as the one shown in FIG. 3, wherein a mirroring slave storage controller is disposed at a location remote from the master storage controller. The master and slave storage controllers can be connected via a T1 or T3 line, or any other communication medium that enables the slave to be disposed remotely from the master. The master ESCON interface unit implements and performs the role of the channel 3 (FIG. 1) and the slave ESCON interface unit serves the role of the control unit 7 (FIG. 1) in implementing the protocols shown in FIGS. 4–6. The slave ESCON interface unit is the only control unit coupled to the channel implemented by the master ESCON interface unit 36. Thus, it is believed that the protocols of FIGS. 5, 6 and 7 will work successfully in such a system, and any errors resulting from the reduced handshaking in the modified protocols will be insignificant in view of the substantial performance improvements provided by these protocols. Using the protocols of the present invention, communication links significantly longer than dedicated ESCON links can be used, with the only limitation on distance being the manner in which the performance requirements of the system are affected by the increased propagation delay that results from increased distance. Thus, communication links ranging from 0 km to, for example, 10,000 km can be implemented using the present invention.

Although the present invention has been discussed above in connection with a single write command, and in the context of a system for providing a remotely located slave storage controller, it should be understood that the present invention is not so limited. The protocol for executing the remaining commands supported by ESCON can be modified in a similar way. Furthermore, the present invention can be used to interface any remotely disposed devices over a general purpose communication medium that need not be dedicated to ESCON communication, and is not limited to providing a remote data storage mirroring facility.

It should be understood the various changes and modifications of the embodiments shown in the drawings and described in the specification may be made within the scope of the invention. It is intended that all matter contained in the above-description and shown in the accompanying drawings be interpreted in an illustrative and not in a limiting sense. The invention is limited only as defined in the following claims and the equivalents thereto.

What is claimed:

1. A method of communicating a plurality of commands from a first device to a second device over a data communication link coupling the first and second devices, the plurality of commands including at least a first command and a second command, the method comprising the step of:

(A) transmitting the first and second commands over the data communication link from the first device to the second device in a single data transmission such that only a single propagation delay through the data communication link is incurred in transmitting both the first and second commands over the data communication link, wherein the first and second commands are transmitted without first checking whether the second device is ready to receive the first and second commands.

2. The method of claim 1, wherein step (A) includes a step of transmitting the first and second commands over a data communication link that is a data communication line operable within a public communication network.

3. The method of claim 1, wherein step (A) includes a step of transmitting the first and second commands over a data communication link that is one of the family of T-carriers.

4. The method of claim 1, wherein the second device returns a status frame for each of the plurality of commands received at the second device, and wherein step (A) includes steps of:

transmitting the first command from the first device onto the data communication link; and
    after transmitting the first command, transmitting the second command from the first device onto the data communication link without awaiting receipt at the first device of the status frame that corresponds to the first command and is returned from the second device when the first command is received at the second device.

5. The method of claim 4, wherein the plurality of commands further includes a third command, wherein each of the plurality of commands is directed to a target address associated with the second device, wherein when the second device receives one of the plurality of commands the second device determines whether the target address associated therewith is capable of processing the one of the plurality of commands and when it is not returns a status frame indicating that the one of the plurality of commands was not processed successfully, and wherein the method further includes steps of:

(B) transmitting the third command over the data communication link from the first device to the second device; and
    (C) in response to receipt of a status frame indicating that the third command was not processed successfully, re-transmitting the third command over the data communication link from the first device to the second device.

6. The method of claim 4, further including steps of:

(B) setting a timer in conjunction with the transmitting of the second command over the data communication link;
    (C) determining whether a status frame, indicating that the second command was received at the second device, is received at the first device before the timer expires; and
    (D) when the timer expires without a status frame being received at the first device indicating that the second command was received at the second device, re-transmitting the second command over the data communication link from the first device to the second device.

7. The method of claim 4, further including a step of transmitting the status frame from the second device to the first device in response to receipt at the second device of the first command.

8. A method of communicating a plurality of commands from a first device to a second device over a data communication link coupling the first and second devices the plurality of commands including at least a first command, a second command, and a group of M commands, wherein the data communication link is bidirectional, the method comprising the steps of:

(A) transmitting the first and second commands over the data communication link from the first device to the second device in a single data transmission such that only a single propagation delay through the data communication link is incurred in transmitting both the first and second commands over the data communication link, wherein the second device returns a status frame for each of the plurality of commands received at the second device, wherein step (A) includes the steps of:
        transmitting the first command from the first device onto the data communication link; and
        after transmitting the first command, transmitting the second command from the first device onto the data communication link without awaiting receipt at the first device of the status frame that corresponds to the first command and is returned from the second device when the first command is received at the second device,
    (B) transmitting the group of M commands over the data communication link from the first device to the second device; and
    (C) following receipt of one of the group of M commands at the second device, transmitting a status frame corresponding to the one of the group of M commands over the data communication link from the second device to the first device while at least one other of the group of M commands is being transmitted over the data communication link from the first device to the second device.

9. A method of communicating a plurality of commands from a first device to a second device over a bidirectional data communication link coupling the first and second devices, the plurality of commands including at least a first command, a second command, and a group of M commands, wherein the second device returns a status frame for each of the plurality of commands received at the second device, the method comprising steps of:

(A) transmitting the first and second commands over the data communication link from the first device to the second device in a single data transmission such that only a single propagation delay through the data communication link is incurred in transmitting both the first and second commands over the data communication link;

(B) transmitting the group of M commands over the data communication link from the first device to the second device; and (C) following transmission of one of the group of M commands over the data communication link from the first device to the second device, receiving a status frame corresponding to the one of the group of M commands over the data communication link at the first device from the second device while simultaneously transmitting at least one other of the group of M commands over the data communication link from the first device to the second device;

wherein the step (A) includes steps of:
transmitting the first command from the first device onto the data communication link; and
after transmitting the first command, transmitting the second command from the first device onto the data communication link without awaiting receipt at the first device of the status frame that corresponds to the first command and is returned from the second device when the first command is received at the second device.

10. The method of claim 4, wherein each of the plurality of commands is directed to a target address associated with the second device, wherein the plurality of commands further includes a third command, and wherein the method further includes steps of:

(B) transmitting the third command over the data communication link from the first device to the second device;

(C) when the third command is received by the second device, determining whether the third command is capable of being processed by its corresponding target address; and (D) when the third command is not capable of being processed by its corresponding target address when received by the second device, transmitting a status frame over the data communication link from the second device to the first device indicating that the third command was not processed successfully.

11. The method of claim 10, further including a step of:

(E) re-transmitting the third command over the data communication link from the first device to the second device in response to receipt of the status frame indicating that the third command was not processed successfully.

12. The method of claim 10, wherein step (D) includes a step of transmitting a status frame indicating that no additional commands directed to the target address of the third command should be sent to the second device until further notice.

13. The method of claim 12, further including a step of transmitting a second status frame over the data communication link from the second device to the first device when the target address to which the third command is directed is ready to receive additional commands.

14. The method of claim 13, further including a step of, in conjunction with transmitting the second status frame, flushing any commands received from the first device that are stored by the second device and have not yet been processed by the second device.

15. The method of claim 13, further including a step of discarding at the second device any commands received from the first device after the transmission of the second status frame and before receipt of a special status frame.

16. The method of claim 15, further including a step of transmitting a status accepted frame over the data communication link from the first device to the second device indicating that the second status frame was received at the first device.

17. The method of claim 16, further including a step of, after transmitting the status accepted frame, re-transmitting the third command over the data communication link from the first device to the second device.

18. The method of claim 17, wherein step (A) includes a step of transmitting the first and second commands over a data communication link that is a data communication line operable within a public communication network.

19. The method of claim 17, wherein the first device is a first storage system coupled to a central processing unit (CPU) and the second device is a second storage system.

20. The method of claim 1, wherein the second device includes a storage buffer capable of simultaneously storing no more than N commands received over the data link from the first device, wherein the plurality of commands includes a group of M commands, wherein M is greater than N, and wherein the method further includes a step of:
transmitting the group of M commands over the data communication link from the first device to the second device in a single data transmission.

21. The method of claim 20, further including a step of transmitting a status frame from the second device to the first device in response to receipt at the second device of each of the group of M commands.

22. The method of claim 20, wherein the first device is a first storage system coupled to a central processing unit (CPU) and the second device is a second storage system.

23. The method of claim 20, wherein step (A) includes a step of transmitting the first and second commands over a data communication link that is a data communication line operable within a public communication network.

24. The method of claim 1, wherein the first device is a first storage system coupled to a central processing unit (CPU) and the second device is a second storage system.

25. The method of claim 24, wherein step (A) includes a step of transmitting the first and second commands over a data communication link that is a data communication line operable within a public communication network.

26. A device for transmitting a plurality of commands to another device over a data communication link, the plurality of commands including at least a first command and a second command, the device comprising:

a transmitter to transmit the plurality of commands over the data communication link from the device to the another device by transmitting the first and second commands over the data communication link in a single data transmission such that only a single propagation delay through the data communication link is incurred in transmitting both the first and second commands over the data communication link, wherein the transmitter transmits the first and second commands without first checking whether the another device is ready to receive the first and second commands.

27. The device of claim 26, wherein the another device includes a command storage buffer capable of simultaneously storing no more than N commands received over the data link from the device, wherein the plurality of commands includes a group of M commands, wherein M is greater than N, and wherein the transmitter further includes:

means for transmitting the group of M commands over the data communication link from the device to the another device in a single data transmission.

28. The device of claim 26, wherein the device is a first storage system adapted to be coupled to a central processing unit (CPU) and the another device is a second storage system.

29. The device of claim 28, wherein the device is a disk drive storage system.

30. The device of claim 26, wherein the device is adapted to work with a data communication link that is a data communication line operable within a public communication network.

31. The device of claim 26, wherein the another device returns a status frame for each of the plurality of commands received at the another device, and wherein the transmitter further includes:

means for transmitting the first command from the device onto the data communication link; and means for, after transmitting the first command, transmitting the second command from the device onto the data communication link without awaiting receipt at the device of the status frame that corresponds to the first command and is returned from the another device when the first command is received at the another device.

32. The device of claim 31, further comprising:

a plurality of timers;

means for setting each of the plurality of timers in conjunction with the transmitting of one of the plurality of commands over the data communication link;

means for determining, for each one of the plurality of commands, whether a status frame, indicating that the one of the plurality of commands was received at the another device, is received at the device before expiration of the timer corresponding to the one of the plurality of commands; and means for, when one of the plurality of timers expires without a status frame being received at the device indicating that the corresponding one of the plurality of commands was received at the another device, re-transmitting the corresponding one of the plurality of commands over the data communication link from the device to the another device.

33. The device of claim 31, further comprising:

a timer;

means for setting the timer in conjunction with the transmitting of the second command onto the data communication link;

means for determining whether a status frame, indicating that the second command was received at the another device, is received at the device before the timer expires; and means for, when the timer expires without a status frame being received at the device indicating that the second command was received at the another device, re-transmitting the second command over the data communication link from the device to the another device.

34. The device of claim 31, wherein the plurality of commands further includes a third command, wherein each of the plurality of commands is directed to a target address associated with the another device, wherein when the another device receives one of the plurality of commands the another device determines whether the target address associated therewith is capable of processing the one of the plurality of commands and when it is not the another device returns a status frame indicating that the one of the plurality of commands was not processed successfully, and wherein the transmitter further includes:

means for transmitting the third command over the data communication link from the device to the another device; and means for, in response to receipt of a status frame indicating that the third command was not processed successfully, re-transmitting the third command over the data communication link from the device to the another device.

35. A device for transmitting a plurality of commands to another device over a bidirectional data communication link, the plurality of commands including at least a first command, a second command, and a group of M commands, wherein the another device returns a status frame for each of the plurality of commands received at the another device, the device comprising:

transmitting means for transmitting the plurality of commands over the data communication link from the device to the another device, the transmitting means including:

means for transmitting the first and second commands over the communication link in a single data transmission such that only a single propagation delay through the data communication link is incurred in transmitting both the first and second commands over the data communication link, the first means including means for transmitting the first command from the device onto the data communication link and means for, after transmitting the first command, transmitting the second command from the device onto the data communication link without awaiting receipt at the device of the status frame that corresponds to the first command and is returned from the another device when the first command is received at the another device;

means for transmitting the group of M commands over the data communication link from the device to the another device; and means for, following transmission of one of the group of M commands over the data communication link from the device to the another device, receiving a status frame corresponding to the one of the group of M commands over the data communication link at the device from the another device while simultaneously transmitting at least one other of the group of M commands over the data communication link from the device to the another device.

36. The device of claim 35, wherein the device is a first storage system adapted to be coupled to a central processing unit (CPU) and the another device is a second storage system.

37. The device of claim 35, wherein the device is adapted to work with a data communication link that is a data communication line operable within a public communication network.

38. The device of claim 37, wherein the device is a first storage system adapted to be coupled to a central processing unit (CPU) and the another device is a second storage system.

39. The device of claim 27, wherein each of the plurality of commands is directed to a target address associated with the another device, wherein when the another device receives one of the plurality of commands the another device determines whether the target address associated therewith is capable of processing the one of the plurality of commands and any additional commands and when it is not the another device returns a status frame indicating that the target address associated with the one of the plurality of commands is disconnected from the link and cannot receive any additional commands until further notice, and wherein the device further includes:

means, responsive to receipt of a status frame identifying a disconnected target address, for identifying the one of the plurality of commands directed to the disconnected target address as having not executed successfully, and for inhibiting the transmitter from transmitting any commands directed to the disconnected target address over the data communication link to the another device.

40. The device of claim 39, wherein the another device transmits a second status frame over the data communication link to the device when the disconnected target address is ready to receive additional commands, and wherein the device further includes means for transmitting a status accepted frame over the data communication link from the device to the another device indicating that the second status frame was received at the device.

41. The device of claim 40, wherein the device further includes means, responsive to receipt of the second status frame, for re-transmitting over the data communication link from the device to the another device the one of the plurality of commands that is directed to the disconnected target address and was identified as having not completed successfully.

42. A communication system comprising:

a first device;

a second device; and a data communication link coupling the first device to the second device;

wherein the first device includes a transmitter to transmit a plurality of commands to the second device over the data communication link, the plurality of commands including at least a first command and a second command by transmitting the first and second commands over the data communication link in a single data transmission such that only a single propagation delay through the data communication link is incurred in transmitting both the first and second commands over the data communication link, wherein the transmitter transmits the first and second commands without first checking whether the second device is ready to receive the first and second commands.

43. The communication system of claim 42, wherein the second device includes means for returning to the first device, over the data communication link, a status frame for each of the plurality of commands received at the second device.

44. The communication system of claim 43, wherein the transmitter includes:

means for transmitting the first command from the first device onto the data communication link; and means for, after transmitting the first command, transmitting the second command from the first device onto the data communication link without awaiting receipt at the first device of the status frame that corresponds to the first command and is returned from the second device when the first command is received at the second device.

45. The communication system of claim 44, wherein the first device further comprises:

a plurality of timers;

means for setting each of the plurality of timers in conjunction with the transmitting of one of the plurality of commands from the first device over the data communication link;

means for determining, for each one of the plurality of commands, whether a status frame, indicating that the one of the plurality of commands was received at the second device, is received at the first device before expiration of the timer corresponding to the one of the plurality of commands; and means for, when one of the plurality of timers expires without a status frame being received at the first device indicating that the corresponding one of the plurality of commands was received at the second device, re-transmitting the corresponding one of the plurality of commands over the data communication link from the first device to the second device.

46. The communication system of claim 44, wherein the first device further comprises:

a timer;

means for setting the timer in conjunction with the transmitting of the second command onto the data communication link;

means for determining whether a status frame, indicating that the second command was received at the second device, is received at the first device before the timer expires; and means for, when the timer expires without a status frame being received at the first device indicating that the second command was received at the second device, re-transmitting the second command over the data communication link from the first device to the second device.

47. The communication system of claim 43, wherein the data communication link is a data communication line operable within a public communication network.

48. The communication system of claim 47, wherein the first device is a first storage system for storing information and the second device is a second storage system, wherein the communication system further includes a central processing unit coupled to the first device, and wherein the communication system further includes mirroring means, distributed between the first and second storage systems, for mirroring at least some of the information stored in the first storage system in the second storage system.

49. The communication system of claim 42, wherein the data communication link is a data communication line operable within a public communication network.

50. The communication system of claim 49, wherein the data communication link is one of the family of T-carriers.

51. A communication system comprising:

a first device;

a second device; and a bidirectional data communication link coupling the first device to the second device;

wherein the first device includes transmitting means for transmitting a plurality of commands to the second device over the data communication link, the plurality of commands including at least a first command, a second command, and a group of M commands;

wherein the transmitting means includes means for transmitting the first and second commands over the data communication link in a single data transmission such that only a single propagation delay through the data communication link is incurred in transmitting both the first and second commands over the data communication link;

wherein the transmitting means in the first device includes means for transmitting the group of M commands over the data communication link from the first device to the second device; and wherein the second device includes means, responsive to receipt of one of the group of M commands at the second device, for transmitting a status frame corresponding to the one of the group of M commands over the data communication link to the first device while the first device is simultaneously transmitting at least one other of the group of M commands over the data communication link to the second device.

52. The communication system of claim 42, wherein:

each of the plurality of commands is directed to a target address associated with the second device; and the second device includes means, responsive to the second device receiving one of the plurality of commands over the data communication link, for determining whether the target address associated with the one of the plurality of commands is capable of processing the one of the plurality of commands and when it is not for returning a status frame to the first device indicating that the one of the plurality of commands was not processed successfully.

53. The communication system of claim 52, wherein:

the plurality of commands further includes a third command;

the transmitter in the first device includes means for transmitting the third command over the data communication link from the first device to the second device; and the first device further includes means for, in response to receipt of a status frame indicating that the third command was not processed successfully, re-transmitting the third command over the data communication link from the first device to the second device.

54. The communication system of claim 42, wherein:

each of the plurality of commands is directed to a target address associated with the second device;

the second device includes means, responsive to receipt of one of the plurality of commands, for determining whether the target address associated with the one of the plurality of commands is capable of processing the one of the plurality of commands and any additional commands and when it is not for returning to the first device a status frame indicating that the target address associated with the one of the plurality of commands is disconnected from the link and cannot receive any additional commands until further notice.

55. The communication system of claim 54, wherein the first device includes means, responsive to receipt of a status frame identifying a disconnected target address, for identifying the one of the plurality of commands directed to the disconnected target address as having not executed successfully, and for inhibiting the transmitter from transmitting any commands directed to the disconnected target address.

56. The communication system of claim 55, wherein the second device includes means for transmitting a second status frame over the data communication link to the first device when the disconnected target address is ready to receive additional commands.

57. The communication system of claim 56, wherein the first device further includes means for transmitting a status accepted frame over the data communication link to the second device indicating that the second status frame was received at the first device.

58. The communication system of claim 57, wherein the first device further includes means, responsive to receipt of the second status frame, for re-transmitting over the data communication link from the first device to the second device the one of the plurality of commands that is directed to the disconnected target address and was identified as having not completed successfully.

59. The communication system of claim 58, wherein the first device is a first storage system for storing information and the second device is a second storage system, wherein the communication system further includes a central processing unit coupled to the first device, and wherein the communication system further includes mirroring means, distributed between the first and second storage systems, for mirroring at least some of the information stored in the first storage system in the second storage system.

60. The communication system of claim 59, wherein the data communication link is a data communication line operable within a public communication network.

61. The communication system of claim 42, wherein the first device is a first storage system for storing information and the second device is a second storage system, and wherein the communication system further includes a central processing unit coupled to the first device.

62. The communication system of claim 61, wherein the data communication link is a data communication line operable within a public communication network.

63. The communication system of claim 61, further including mirroring means, distributed between the first and second storage systems, for mirroring at least some of the information stored in the first storage system in the second storage system.

64. The communication system of claim 63, wherein the data communication link is a data communication line operable within a public communication network.

65. The communication system of claim 63, wherein the mirroring means includes:

first means, disposed in the first storage system, for transmitting the at least some of the information stored in the first storage system to the second storage system; and second means, disposed in the second storage system, for storing in the second storage system the at least some of the information transmitted from the first storage system.

66. The communication system of claim 65, wherein the mirroring means further includes:

third means, disposed in the first storage system, for transmitting a request to the second storage system to transmit at least one information frame stored in the second storage system to the first storage system; and fourth means, disposed in the second storage system, for transmitting the at least one information frame to the first storage system in response to receipt of the request.

67. A communication system comprising:

a first device;

a second device; and a data communication link coupling the first device to the second device;

wherein the first device includes a transmitter to transmit a plurality of commands to the second device over the data communication link, the plurality of commands including at least a first command and a second command, by transmitting the first and second commands over the data communication link in a single data transmission such that only a single propagation delay through the data communication link is incurred in transmitting both the first and second commands over the data communication link; and wherein:

the plurality of commands includes a group of M commands;

the second device includes a command storage buffer capable of simultaneously storing no more than N commands received over the data link from the first device, wherein M is greater than N; and the transmitter in the first device includes means for transmitting the group of M commands over the data communication link from the first device to the second device in a single data transmission.

68. The communication system of claim 67, wherein the first device is a first storage system for storing information and the second device is a second storage system, wherein the communication system further includes a central processing unit coupled to the first device, and wherein the communication system further includes mirroring means, distributed between the first and second storage systems, for mirroring at least some of the information stored in the first storage system in the second storage system.

69. The communication system of claim 68, wherein the data communication link is a data communication line operable within a public communication network.

70. A device for receiving a plurality of commands from another device over a data communication link, the plurality of commands including at least a first command and a second command, the device comprising:

receiving means for receiving the plurality of commands over the data communication link from the another device, the receiving means including means for receiving the first and second commands over the data communication link in a single data transmission such that only a single propagation delay through the data communication link is incurred in receiving both the first and second commands over the data communication link, wherein the receiving means includes means for receiving the first and second commands without first indicating to the another device that the device is ready to receive the first and second commands.

71. The device of claim 70, wherein the device includes a command storage buffer capable of simultaneously storing no more than N commands received over the data link from the another device, wherein the plurality of commands includes a group of M commands, wherein M is greater than N, and wherein the receiving means further includes:

means for receiving the group of M commands over the data communication link from the another device in a single data transmission.

72. The device of claim 70, wherein the device is a first storage system and the another device is a second storage system adapted to be coupled to a central processing unit (CPU).

73. The device of claim 72, wherein the device is a disk drive storage system.

74. The device of claim 72, wherein the device is adapted to work with a data communication link that is a data communication line operable within a public communication network.

75. A method of communicating a plurality of data transfers from a first device to a second device over a data communication link coupling the first and second devices, the plurality of data transfers including at least a first data transfer and a second data transfer, the first data transfer requiring that a response be transmitted from the second device to the first device, the method comprising steps of:

(A) transmitting the first data transfer over the data communication link from the first device to the second device; and (B) transmitting the second data transfer over the data communication link from the first device to the second device without awaiting receipt at the first device of the response to the first data transfer;

wherein the first and second data transfers are transmitted without first checking that the second device is ready to receive the first and second data transfers.

76. The method of claim 75, wherein step (A) includes a step of transmitting the first data transfer over a data communication link that is a data communication line operable within a public communication network; and wherein step (B) includes a step of transmitting the second data transfer over the data communication line operable within a public communication network.

77. The method of claim 75, wherein the second device includes a storage buffer capable of simultaneously storing no more than N data transfers received over the data link from the first device, wherein the plurality of data transfers includes a group of M data transfers, wherein M is greater than N, and wherein the method further includes a step of:

transmitting the group of M data transfers over the data communication link from the first device to the second device in a single data transmission.

78. The method of claim 75, wherein the first device is a first storage system coupled to a central processing unit (CPU) and the second device is a second storage system.

79. The method of claim 78, wherein step (A) includes a step of transmitting the first data transfer over a data communication link that is a data communication line operable within a public communication network; and wherein step (B) includes a step of transmitting the second data transfer over the data communication line operable within a public communication network.

80. A method of communicating a plurality of data transfers from a first device to a second device over a data communication link coupling the first and second devices, the plurality of data transfers including at least a first data transfer and a second data transfer, the first data transfer requiring that a response be transmitted from the second device to the first device, the method comprising steps of:

(A) transmitting the first data transfer over the data communication link from the first device to the second device; and (B) transmitting the second data transfer over the data communication link from the first device to the second device without awaiting receipt at the first device of the response to the first data transfer;

wherein the second device includes a plurality of target addresses, wherein step (A) includes a step of transmitting the first data transfer to a first of the plurality of target addresses; and wherein step (B) includes a step of transmitting the second data transfer to a second of the plurality of target addresses that is different than the first of the plurality of target addresses.

81. The method of claim 80, wherein steps (A) and (B) include a step of transmitting the first and second data transfers over the data communication link from the first device to the second device in a single data transmission.

82. The method of claim 81, wherein the first device is a first storage system coupled to a central processing unit (CPU) and the second device is a second storage system.

83. The method of claim 82, wherein step (A) includes a step of transmitting the first data transfer over a data communication link that is a data communication line operable within a public communication network; and wherein step (B) includes a step of transmitting the second data transfer over the data communication line operable within a public communication network.

84. A device for transmitting a plurality of data transfers to another device over a data communication link, the plurality of data transfers including at least a first data transfer and a second data transfer, the first data transfer requiring that a response be transmitted from the another device to the device, the device comprising:
  a transmitter to transmit the plurality of data transfers over the data communication link from the device to the another device with the first data transfer being transmitted prior to the second data transfer by transmitting the second data transfer over the data communication link without awaiting receipt at the device of the response to the first data transfer, wherein the transmitter transmits the first and second data transfers without first checking that the another device is ready to receive the first and second data transfers.

85. The device of claim 84, wherein the device is a first storage system adapted to be coupled to a central processing unit (CPU) and the another device is a second storage system.

86. The device of claim 85, wherein the device is adapted to work with a data communication link that is a data communication line operable within a public communication network.

87. A device for transmitting a plurality of data transfers to another device over a data communication link, the plurality of data transfers including at least a first data transfer and a second data transfer, the first data transfer requiring that a response be transmitted from the another device to the device, the device comprising:
  transmitting means for transmitting the plurality of data transfers over the data communication link from the device to the another device with the first data transfer being transmitted prior to the second data transfer, the transmitting means including means for transmitting the second data transfer over the data communication link without awaiting receipt at the device of the response to the first data transfer;
  wherein the device is a first storage system adapted to be coupled to a central processing unit (CPU) and the another device is a second storage system;
  wherein the another device includes a plurality of target addresses, and wherein the transmitting means includes means for transmitting the first data transfer to a first of the plurality of target addresses and the second data transfer to a second of the plurality of target addresses that is different than the first of the plurality of target addresses.

88. The device of claim 87, wherein the transmitter includes means for transmitting the first and second data transfers over the data communication link in a single data transmission.

89. A device for transmitting a plurality of data transfers to another device over a data communication link, the plurality of data transfers including at least a first data transfer and a second data transfer, the first data transfer requiring that a response be transmitted from the another device to the device, the device comprising:
  transmitting means for transmitting the plurality of data transfers over the data communication link from the device to the another device with the first data transfer being transmitted prior to the second data transfer, the transmitting means including means for transmitting the second data transfer over the data communication link without awaiting receipt at the device of the response to the first data transfer;
  wherein the another device includes a plurality of target addresses, and wherein the transmitting means includes means for transmitting the first data transfer to a first of the plurality of target addresses and the second data transfer to a second of the plurality of target addresses that is different than the first of the plurality of target addresses.

90. The device of claim 89, wherein the transmitter includes means for transmitting the first and second data transfers over the data communication link in a single data transmission.

91. The method of claim 1, wherein the first and second commands are transmitted without receiving, at the first device, a notification from the second device that the second device is ready to receive the first and second commands.

92. The device of claim 26, wherein the transmitter transmits the first and second commands without receiving a notification from the another device that the another device is ready to receive the first and second commands.

93. The communication system of claim 42, wherein the transmitter transmits the first and second commands without receiving a notification from the second device that the second device is ready to receive the first and second commands.

94. The device of claim 70, wherein the receiving means includes means for receiving the first and second commands without first sending a notification to the another device that the device is ready to receive the first and second commands.

95. The method of claim 75, wherein the first and second data transfers are transmitted without receiving, at the first device, a notification from the second device that the second device is ready to receive the first and second data transfers.

96. The device of claim 84, wherein the transmitter transmits the first and second data transfers without receiving a notification from the another device that the another device is ready to receive the first and second data transfers.

* * * * *